US012792588B2

(12) United States Patent
Murthy et al.

(10) Patent No.: US 12,792,588 B2
(45) Date of Patent: Nov. 10, 2026

(54) GENERATING EXECUTION PLANS FOR NATURAL LANGUAGE DATA ANALYTICS REQUESTS BASED ON PREVIOUSLY PROCESSED MATCHING REQUESTS

(71) Applicant: Isotopes AI, Inc., Palo Alto, CA (US)

(72) Inventors: Arun Chikkatur Murthy, Palo Alto, CA (US); Gopal Vijayaraghavan, South San Francisco, CA (US); Prasanth Jayachandran, San Jose, CA (US)

(73) Assignee: Isotopes AI, Inc., Palo Alto, CA (US)

( * ) Notice: Subject to any disclaimer, the term of this patent is extended or adjusted under 35 U.S.C. 154(b) by 0 days.

(21) Appl. No.: 19/354,768

(22) Filed: Oct. 9, 2025

(65) Prior Publication Data

US 2026/0300252 A1 Oct. 1, 2026

Related U.S. Application Data

(63) Continuation of application No. 19/091,742, filed on Mar. 26, 2025, now Pat. No. 12,455,871.

(51) Int. Cl.
*G06F 16/00* (2019.01)
*G06F 16/215* (2019.01)
*G06F 16/23* (2019.01)

(52) U.S. Cl.
CPC .......... *G06F 16/235* (2019.01); *G06F 16/215* (2019.01); *G06F 16/2358* (2019.01)

(58) Field of Classification Search
USPC .......................................................... 707/609
See application file for complete search history.

(56) References Cited

FOREIGN PATENT DOCUMENTS

WO WO-2025059465 A1 * 3/2025 ....... G06Q 10/06313

OTHER PUBLICATIONS

Xiao et al. (CN-119990565-A), “Emergency Intelligent Agent, Emergency Processing System, Method, Medium and Device”, 2024-12-10, 15 Pages. (Year: 2024).*
Wei et al. (CN-117556008-A), “Interactive Method, Medium, Device and Computing Device Based on Large Language Model”, Nov. 13, 2023, 18 Pages. (Year: 2023).*

(Continued)

*Primary Examiner* — Bai D Vu
(74) *Attorney, Agent, or Firm* — Fenwick & West LLP

(57) ABSTRACT

A system determines an exposure of datasets to changes in constraints associated with data analytics, for example, policy constraints of an organization. The system stores a set of policy constraints associated with datasets of an organization, each constraint describing a step performed for creating a dataset. The system generates execution plans for natural language data analytics requests. The execution plan includes steps, each step comprising a set of instructions. One or more steps of the execution plan are associated with a constraint. The system generates the dataset by executing the execution plan and stores an association between the dataset and the constraint. The system uses the associations to identify datasets and execution plans that may be impacted as a result of modification of a policy constraint and generates a report to determine whether the modification to the policy constraint be permitted.

18 Claims, 20 Drawing Sheets

(56) References Cited

OTHER PUBLICATIONS

Liang et al. (CN-117056519-A), “Method For Automatically Generating Cross-domain Legislative Opinion Comprehensive Report”, Aug. 17, 2023, 9 Pages. (Year: 2023).*

Wang (CN-117290352-A), “Index Establishing Method, Electronic Device and Computer Storage Device”, Jun. 16, 2022 15 Pages. (Year: 2022).*

Liang et al. (CN-117056519-A), “Method for Automatically Generating Cross-domain Legislative Opinion Comprehensive Report”, Nov. 14, 2023, 9 pages. (Year: 2023).

Wang (CN-117290352-A), “Index Establishing Method, Electronic Device and Computer Storage Device”, Dec. 26, 2023, 15 pages. (Year: 2023)

Zeng et al. (CN-111949643-A), “Data Processing Method and System Basedon Business Modeling”, Nov. 17, 2020, 13 pages. (Year: 2020).

* cited by examiner

GENERATING EXECUTION PLANS FOR NATURAL LANGUAGE DATA ANALYTICS REQUESTS BASED ON PREVIOUSLY PROCESSED MATCHING REQUESTS

CROSS REFERENCE TO RELATED APPLICATIONS

This application is a continuation of co-pending U.S. application Ser. No. 19/091,742, filed Mar. 26, 2025, which is incorporated by reference in its entirety.

TECHNICAL FIELD

One or more aspects described herein relate generally to data analytics, and more specifically to processing natural language data analytics requests using machine learning based language models.

BACKGROUND

Organizations generate large amounts of data, for example, data describing transactions, events generated by various systems, logs generated by various platforms, sensor data generated by IoT (Internet of Things) devices, and so on. The data generated is typically stored in heterogeneous systems using various formats, for example, in files, relational databases, documents, transaction logs, and so on. Organizations generate analytics reports based on such data to gain insights into the data. Analyzing such data is a complex process that requires technological expertise of various platforms that store the data as well as understanding of the high-level goals of analysis. Typically, users that are able to process data stored in various platforms are data engineers that have technical expertise with various systems. In contrast, users who exhibit understanding of high-level goals of analysis are domain experts that typically lack the low-level technical expertise of interacting with the various systems. There is often a communication gap between the two sets of users trying to achieve the goal of analyzing data of the organization. The gap may result in multiple iterations of interactions between users with different expertise in the best case and generation of incorrect reports resulting in poor analytic decisions in the worst case. Such processes are often error prone and cumbersome.

SUMMARY

In accordance with one or more aspects, a system, for example, an online system processes natural language-based data analytics requests using data stored in data sources to generate data analytics reports. The system uses machine learning based language models, for example, large language models (LLMs) to generate execution plans for natural language data analytics requests and executes them.

According to an embodiment, the system determines an exposure of datasets to changes in constraints associated with data analytics, for example, policy constraints of an organization. The system stores a set of constraints associated with datasets of an organization, each constraint describing a step performed for creating a dataset. The system generates a plurality of datasets by repeating following steps for each of a plurality of natural language data analytics requests. The system receives a natural language data analytics request based on data stored in one or more data stores and generates an execution plan for processing the natural language data analytics request using a machine learning based language model. The execution plan comprises a set of steps, each step comprising a set of instructions. One or more steps of the execution plan are associated with a constraint of the set of constraints. The system generates the dataset by executing the execution plan. The system stores an association between the dataset and the constraint.

The system receives a request to replace a constraint with a modified constraint. The system identifies a subset of datasets that are associated with the constraint and sends information describing the subset of datasets as datasets impacted by modification of the constraint.

The system may make a decision whether to block the modification to the constraint or permit the modification based on either predefined rules or based on user feedback. If the system permits the modification to proceed, the system identifies the steps of existing execution plans that are affected as a result of the modification and regenerates the instructions for these steps.

According to an embodiment, the system processes natural language data analytics requests based on data stored in one or more data stores. The system generates a prompt for sending to a machine learning based language model. The system builds an execution plan for processing the natural language data analytics request based on the response received from the machine learning based language model. The system iteratively refines the execution plan for processing the natural language data analytics request, by repeatedly performing following steps.

The system stores a finalized execution plan for processing the natural language data analytics request obtained by iteratively refining the execution plan. The system may execute the execution plan repeatedly to generate reports and send the generated reports for display via a user interface.

According to an embodiment, the system generates partially materialized execution plans for processing the natural language data analytics requests. The partially materialized execution plan comprises sets of instructions that are materialized (or frozen). A materialized set of instructions remains unchanged if the partially materialized execution plan is regenerated from the natural language data analytics request using the machine learning based language model. The system iteratively refines the partially materialized execution plan, by performing the following steps repeatedly. The system stores a finalized execution plan obtained by iteratively refining the partially materialized execution plan and executes the finalized execution plan to generate reports.

According to an embodiment, the system performs in-context learning of data analytics agents by generating execution plans for natural language data analytics requests specific to the data agent. A user provides several natural language data analytics requests relevant to the context for which the data analytics agents are being trained. Multiple users may provide feedback during execution of the execution plans of the natural language data analytics requests. Explicit feedback provided by users as well as implicit feedback is used for evaluating the new execution plan to determine whether the new execution plan should replace an existing execution plan stored in the system for a matching natural language data analytics request.

Embodiments of the invention include computer-implemented methods described herein, non-transitory computer readable storage media storing instructions for performing steps of the methods disclosed herein, and systems comprising one or more computer processors and computer readable non-transitory storage medium to perform steps of the computer-implemented methods disclosed herein.

Figure 1:
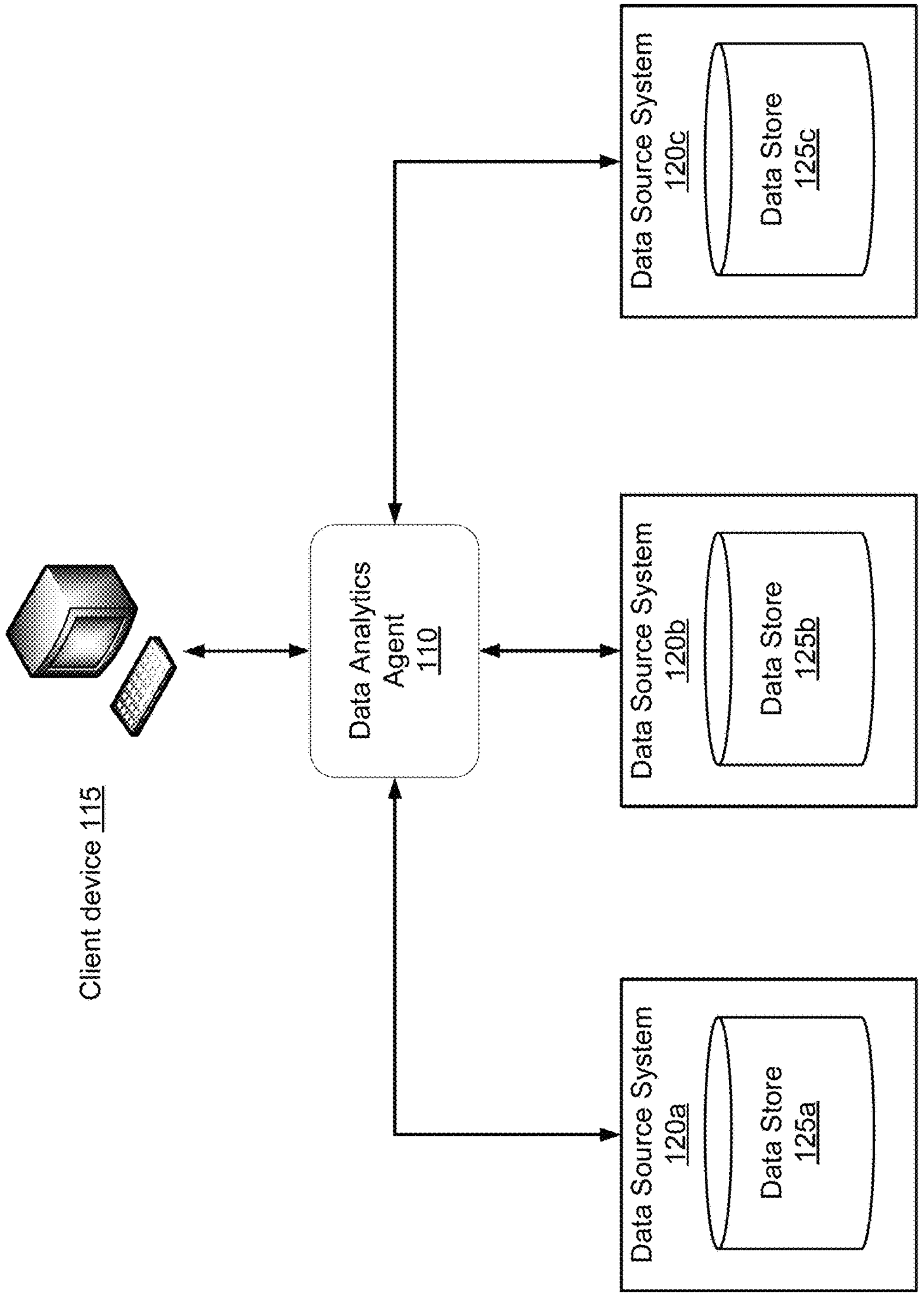
FIG. 1 illustrates an example system environment for an online system, in accordance with one or more embodiments.

The features and advantages described in the specification are not all inclusive and in particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the disclosed subject matter.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

DETAILED DESCRIPTION

Organizations often store data in various data sources, for example, relational databases, data warehouses, files, spreadsheets, logs, document databases and so on. Users that typically have expertise in interacting with such systems are data engineers. Data engineers typically perform various tasks such as cleansing of the data stored in various data stores and pre-processing it for analysis. Domain experts that understand high-level requirements of data analysis and the types of analytics reports that need to be generated interact with such data engineers to guide their data cleansing or data processing efforts.

A system according to various embodiments uses a data analytics agent that receives high-level description of the analytics reports that need to be generated. The high-level description may be specified using natural languages. The data analysis agent generates execution plans for processing the data from the various data sources and generating the analytics reports. The execution plan represents a data pipeline that processes the data through various steps to generate a desired report. For example, the execution plan may perform various tasks such as fetch data from one or more data stores, perform data cleansing operations such as formatting the data, segmenting the data, analyzing the data to generate results as requested, visualizing data, and so on. The execution plan is stored in a data store and accessed at execution time to process various requests specified using natural language. Once an execution plan is finalized, the system may automatically generate analytics reports, for example, on a periodic basis and display via a dashboard.

According to an embodiment, the system receives natural language instructions from a user, for example, an expert providing details of a data analytics task to be performed. The system generates an execution plan for performing the data analytics task. The system iteratively refines the execution plan based on feedback from the user. In the iterative process the system may partially materialize (i.e., freeze) certain portions of the execution plan that are not modified in subsequent iterations. This allows the system to generate an execution plan that processes in a deterministic manner even though the system generates the execution plan with the help of a machine learning based large language model that may be non-deterministic and configured to generate different outputs when executed multiple times for the same input.

The system allows the user to change a portion of the execution plan by providing natural language based instructions. The system determines a risk exposure as a result of the change by determining all the reports that were previously generated based on the original execution plan before the change. This provides users with insight into the overall impact of a change in the user specification. Furthermore, the system automatically determines the changes to the remaining steps of the execution plan in response to receiving a change to a specific portion of the execution plan caused by the change in user specification of the data analytics task.

The system further performs in-context learning by receiving user feedback from one or more users to iteratively improve execution plans for data analytics tasks. The iteratively refined execution plans are materialized and software artifacts based on the execution plans are generated and provided to end users for use. The end users are able to use the execution plans within having to provide feedback at various stages of the execution plan.

System Environment

FIG. 1 shows the overall system environments in which a data analytics agent operates, according to an embodiment. FIG. 1 illustrates an example system environment for an online system 200, in accordance with one or more embodiments. The system environment illustrated in FIG. 1 includes client device 115, a data analytics agent 110 and one or more data source systems 120. Alternative embodiments may include more, fewer, or different components from those illustrated in FIG. 1, and the functionality of each component may be divided between components differently from the description below. Additionally, each component may perform their respective functionalities in response to a request from a human, or automatically without human intervention. Additionally, any number of client devices 115 may interact with the data analytics agent 110.

Figure 2:
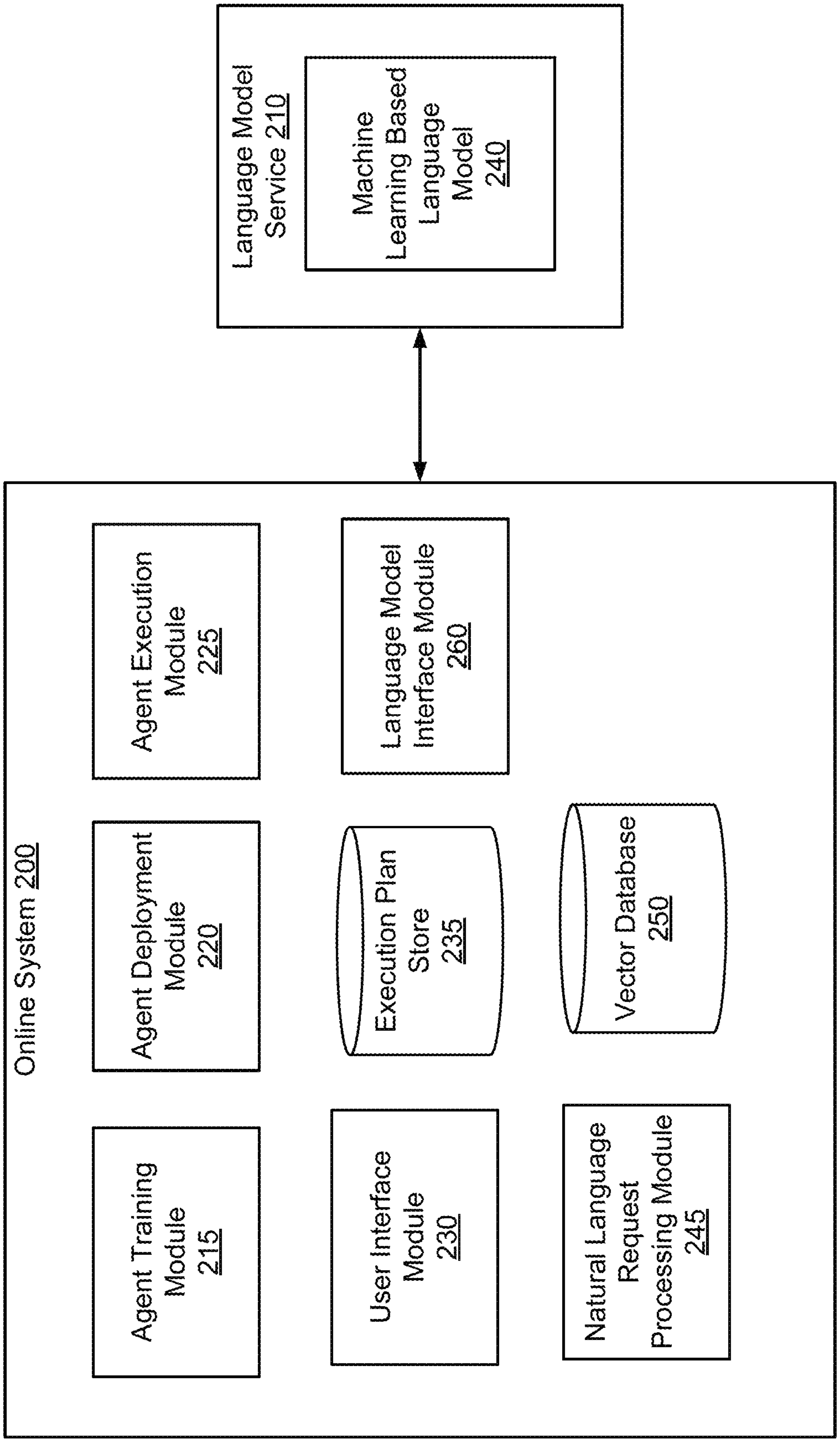
FIG. 2 shows the system architecture of an online system interacting with a language model service, according to an embodiment.

The data analytics agent 110 may execute in an online system, for example, the online system 200 illustrated in FIG. 2. The data analytics agent 110 receives natural language questions from the client device 115. The client device 115 may display a user interface that allows an expert, for example, an analyst to input natural language questions. The natural language questions may specify a data analytics report based on data stored in various data stores 125*a*, 125*b*, 125*c* available in the data source systems 120*a*, 120*b*, 120*c* respectively. A natural language question that requests a data analytics report may also be referred to herein as a natural language data analytics question or a natural language analytics question. The data analytics agent 110 uses a machine learning based language model to generate an execution plan for processing the natural language question. The execution plan is executed to generate the report requested by the user via the client device 115. The report is displayed via a user interface, for example, a dashboard displayed via a client device 115.

Although FIG. 1 shows a single data analytics agent 110, other embodiments have multiple data analytics agents 110. For example, different agents may be trained to interact with different types of data sources; certain data analytics agents 110 may have the knowledge to perform specific type of analytic processing and so on. According to an embodiment, the system creates a network of agents that interact with each other to process the full data analysis pipeline. For example, a data analytics agent 110 that is trained to generate high level process flow interacts with data analytics agents 110 that are trained to process individual steps of the high-level process flow and coordinates the interactions between different data analytics agents 110. Accordingly, a hierarchy of data analytics agents 110 may be created to divide the data analytics task recursively into smaller subtasks and process them.

The client device 115 can be a personal or mobile computing device, such as a smartphone, a tablet, a laptop computer, or desktop computer. In some embodiments, the client device 100 executes a client application that uses an application programming interface (API) to communicate with the data analytics agent 110. The client device 100 presents a user interface that allows the user to interact with the data analytics agent 110.

The client device 115 allows users to interact with the data analytics agent 110 via a network. (not shown in FIG. 1) that enables communications between the devices. In one embodiment, the network uses standard communications technologies and/or protocols. The data exchanged over the network can be represented using technologies and/or formats including the hypertext markup language (HTML), the extensible markup language (XML), etc. In addition, all or some links can be encrypted using conventional encryption technologies such as secure sockets layer (SSL), transport layer security (TLS), virtual private networks (VPNs), Internet Protocol security (IPsec), etc. Depending upon the embodiment, the network can also include links to other networks such as the Internet.

System Architecture

FIG. 2 shows the system architecture of an online system interacting with a language model service, according to an embodiment. Other embodiments can have fewer or more modules than indicated in FIG. 2.

The online system 200 illustrated in FIG. 2 includes an agent training module 215, an agent deployment module 220, an agent execution module 225, a user interface module 230, an execution plan store 235, a language model interface module 260, a natural language request processing module 245, and a vector database 280. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The user interface module 230 configures user interfaces for presentation to a user via a client device 100. The user interfaces configured by the user interface module 230 allow users to provide information to the online system 200, for example, natural language data analytics requests. The FIG. 10 shows screenshots of various user interfaces configured by the online system 200 according to various embodiments.

The agent training module 215 generates agents trained to perform specific tasks. For example, an agent may be trained to interact with a particular type of data store. According to an embodiment, the training of a data analytics agent is based on in-context learning. For example, a user such as an expert user, uses the data analytics agent to interact with a data store in a particular context and makes several natural language data analytics requests specific to the context. The online system asks the user several questions related to evaluation of each natural language data analytics request that is processed. The user provides feedback, for example, by approving whether certain types of techniques used for data analytics are suitable for use in the context, whether the instructions used for performing certain steps conform to certain policy constraints of the organization, and so on.

The agent deployment module 220 generates artifacts that store all the information needed to instantiate an agent on a system. The agent deployment module 220 transmits the artifacts to a target system so that the target system can instantiate the agent and execute it.

The analytics agent execution module 225 receives the artifacts provided by the agent deployment module 220 and executes the agent. The agent may interact with a system for example, a data store. An agent may interact with a user by receiving natural language requests from the user and processing the natural language requests.

The user interface module 230 configures user interfaces and presents to the user. The user interface module 230 receives user inputs via the user interfaces and provides the user input to appropriate modules of the online system 200. For example, the user interface module 230 may receive natural language requests and provide them to the natural language request processing module 245. The user interface module 230 further receives results of processing the natural language requests from the machine learning based language model 240 and provides them to the user. For example, the result of processing a natural language request may be a visualization of a particular report. The user interface module 230 configures a user interface that displays the visualized report and sends for display to a client device 115.

The execution plan store 235 stores execution plans of previously received natural language requests, for example, natural language data analytics requests. The online system 200 may execute a natural language data analytics request on a periodic basis to display a visualization of a report via a dashboard. According to an embodiment, the online system 200 may receive a modification of previously received natural language data analytics requests and access the closest matching natural language data analytics requests that was previously processed. The online system 200 may use the vector database to identify the closest natural language data analytics request to the input natural language data analytics request received, for example, based on vector distances of previously processed natural language data analytics requests from the input natural language data analytics request. The online system 200 accesses the execution plan of the closest natural language data analytics request that was previously processed and modifies the execution plan of the previously processed natural language data analytics request to generate an execution plan of the input natural language data analytics request.

According to an embodiment, the execution plan represents a data pipeline, and each step of the execution plan corresponds to a stage of the data pipeline. Each stage receives data generated by a previous stage, processes the data and provides the data as input to the next stage in the pipeline. The first stage receives input that is processed by the data pipeline and the last stage outputs the result of executing the data pipeline.

The language model interface module 260 interfaces with the language model service 210. The language model service 210 includes a machine learning based language model 240. The machine learning based language model 240 may generate prompts for sending to the language model service 210. The machine learning based language model 240 invokes APIs (application programming interfaces) of the language model service 210 to execute the 240 using the generated prompt and receive a response obtained by executing the machine learning based language model 240. The language model service 210 may be invoked by other modules of the online system 200 for example, the natural language request processing module 245.

The natural language request processing module 245 executes the various processes described herein to receive a natural language request, for example, a natural language data analytics request and generates an execution plan for processing the natural language request. The execution plan may comprise a sequence of steps. Each step may further comprise steps to perform specific tasks. For example, natural language data analytics request may identify a particular type of data analysis and the execution plan may comprise steps such as accessing data from a specific source, segmenting users based on a particular technique, using a specific statistical model to analyze the segments, generate a report, generate visualization of the report, and so on.

According to an embodiment, the online system stores information such as natural language data analytics requests received in the past in a vector database 250. According to an embodiment, the natural language request processing module 245 generates a vector representation of natural language data analytics requests. The vector representation of a natural language data analytics request may be an embedding representing an output of a hidden layer of a neural network trained to encode natural language text. According to an embodiment, the natural language request processing module 245 requests the machine learning based language model to generate the vector embeddings corresponding to a natural language data analytics request. The vector database 250 allows the online system 200 to identify past natural language data analytics requests that are similar to an input natural language data analytics request. The vector database 250 identifies natural language data analytics requests having vector representations that are within a threshold vector distance of an input natural language data analytics request. The vector distance may be based on a cosine similarity metric. The online system 200 may provide a vector representation of a natural language data analytics request to the vector database 250 to determine all past natural language data analytics requests that are similar to an input natural language data analytics request so as to access their execution plans from the execution plan store 235.

In one or more embodiments, the machine learning based language model 240 is a large language model (LLM) trained on a large corpus of training data to generate outputs for the NLP tasks. An LLM may be trained on massive amounts of text data, often involving billions of words or text units. The large amount of training data from various data sources allows the LLM to generate outputs for many tasks. An LLM may have a significant number of parameters in a deep neural network (e.g., transformer architecture), for example, at least 1 billion, at least 15 billion, at least 135 billion, at least 175 billion, at least 500 billion, at least 1 trillion, at least 1.5 trillion parameters.

Since an LLM has significant parameter size and the amount of computational power for inference or training the LLM is high, the LLM may be deployed on an infrastructure configured with, for example, supercomputers that provide enhanced computing capability (e.g., graphic processor units) for training or deploying deep neural network models. In one instance, the LLM may be trained and deployed or hosted on a cloud infrastructure service. The LLM may be pre-trained by the online system 200 or one or more entities different from the online system 200. An LLM may be trained on a large amount of data from various data sources. For example, the data sources include websites, articles, posts on the web, and the like. From this massive amount of data coupled with the computing power of LLMs, the LLM is able to perform various tasks and synthesize and formulate output responses based on information extracted from the training data.

In one or more embodiments, the machine learning based language model 240 is a transformer neural network architecture. Specifically, the transformer model is coupled to receive sequential data tokenized into a sequence of input tokens and generates a sequence of output tokens depending on the task to be performed. In one or more embodiments, when the machine-learned model including the LLM is a transformer-based architecture, the transformer has a generative pre-training (GPT) architecture including a set of decoders that each perform one or more operations to input data to the respective decoder. A decoder may include an attention operation that generates keys, queries, and values from the input data to the decoder to generate an attention output. In another embodiment, the transformer architecture may have an encoder-decoder architecture and includes a set of encoders coupled to a set of decoders. An encoder or decoder may include one or more attention operations.

While a LLM with a transformer-based architecture is described as a primary embodiment, it is appreciated that in other embodiments, the machine learning based language model 240 can be configured as any other appropriate architecture including, but not limited to, long short-term memory (LSTM) networks, Markov networks, BART, generative-adversarial networks (GAN), diffusion models (e.g., Diffusion-LM), and the like.

The training module 260 trains machine learning models used by the online system 200. The online system 200 may use machine learning models to perform functionalities described herein. Example machine learning models include regression models, support vector machines, naïve bayes, decision trees, k nearest neighbors, random forest, boosting algorithms, k-means, and hierarchical clustering. The machine learning models may also include neural networks, such as perceptrons, multilayer perceptrons, convolutional neural networks, recurrent neural networks, sequence-to-sequence models, generative adversarial networks, or transformers.

In one or more embodiments, the online system 200 receives a pre-trained machine learning based language model 240 and the training module 260 additionally fine-tunes parameters of the machine learning based language model 240 using multiple instances of training data. An instance in the training data may include strings or sentences obtained by concatenating inputs and expected outputs of the machine learning based language model. For example, the training data may comprise natural language questions received from users with lists of items, item types, or categories of items associated with the natural language question. The machine learning based language model receives an input sentence with missing tokens from the output portion of the input sentence and predicts the missing tokens. A loss function is computed by aggregating loss values obtained from the predicted tokens and the known tokens of the output portion of the sentences provided as training data. The errors obtained from the loss function are backpropagated to update parameters of the machine-learned model.

Each machine learning model includes a set of parameters. A set of parameters for a machine learning model are parameters that the machine learning model uses to process an input. For example, a set of parameters for a linear regression model may include weights that are applied to each input variable in the linear combination that comprises the linear regression model. Similarly, the set of parameters for a neural network may include weights and biases that are applied at each neuron in the neural network. The training module 260 generates the set of parameters for a machine learning model by "training" the machine learning model. Once trained, the machine learning model uses the set of parameters to transform inputs into outputs.

The training module 260 trains a machine learning model based on a set of training examples. Each training example includes input data to which the machine learning model is applied to generate an output. For example, each training example may include user data, item data, or order data. In some cases, the training examples also include a label which represents an expected output of the machine learning model. In these cases, the machine learning model is trained by comparing its output from input data of a training example to the label for the training example.

The training module 260 may apply an iterative process to train a machine learning model whereby the training module 260 trains the machine learning model on each of the set of training examples. To train a machine learning model based on a training example, the training module 260 applies the machine learning model to the input data in the training example to generate an output. The training module 260 scores the output from the machine learning model using a loss function. A loss function is a function that generates a score for the output of the machine learning model such that the score is higher when the machine learning model performs poorly and lower when the machine learning model performs well. In cases where the training example includes a label, the loss function is also based on the label for the training example. Some example loss functions include the mean square error function, the mean absolute error, hinge loss function, and the cross-entropy loss function. The training module 260 updates the set of parameters for the machine learning model based on the score generated by the loss function. For example, the training module 260 may apply gradient descent to update the set of parameters.

With respect to the machine-learned models hosted by the model serving system 150, the machine-learned models may already be trained by a separate entity from the entity responsible for the online system 200. In another embodiment, when the model serving system 150 is included in the online system 200, the training module 260 may further train parameters of the machine-learned model based on data specific to the online system 200 stored in the data store 270. As an example, the training module 260 may obtain a pre-trained transformer language model and further fine tune the parameters of the transformer model using training data stored in the data store 270.

Generating Execution Plans for Natural Language Data Analytics Requests

Figure 3:
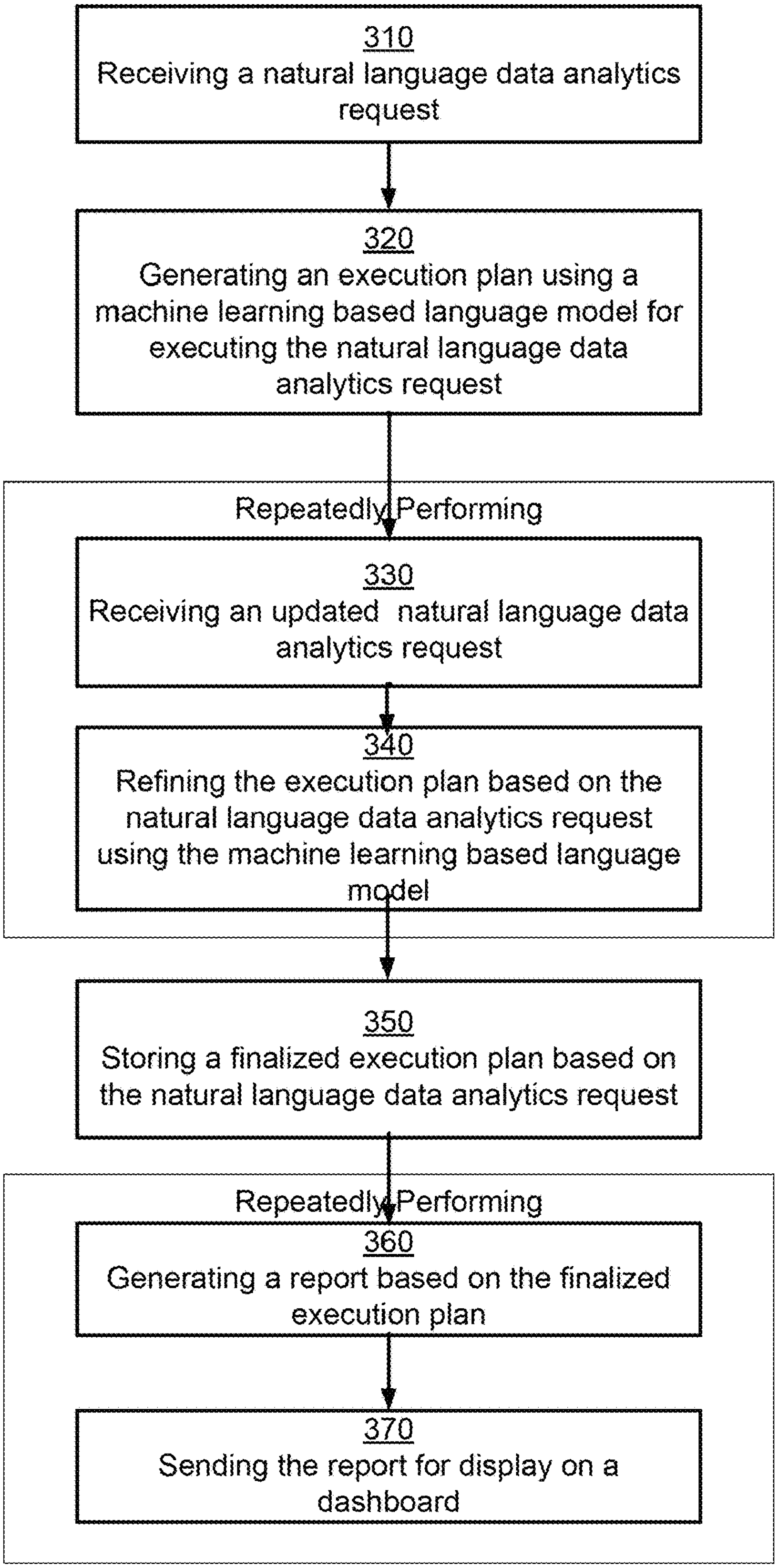
FIG. 3 is a flowchart illustrating a process for generating an execution plan based on a natural language analytics request, according to an embodiment.

FIG. 3 is a flowchart illustrating a process for generating an execution plan based on a natural language analytics request, according to an embodiment. Alternative embodiments may include more, fewer, or different steps from those illustrated in FIG. 3, and the steps may be performed in a different order from that illustrated in FIG. 3. The steps are described as being performed by a system, for example, the online system 200 and may be performed by one or more modules of the system. Additionally, each of these steps may be performed automatically by the online system without human intervention.

As shown in the flowchart of FIG. 3, the system receives 310 a natural language data analytics request. The natural language data analytics request is a request specified using natural language and requesting information based on data analytics performed using data stored in one or more data stores 125. The natural language data analytics request may be received from a user who is a domain expert, for example, an analyst.

The system generates 320 an execution plan for processing the natural language data analytics request. The execution plan is generated using a machine learning based language model 240. According to an embodiment, the system generates a prompt for sending to a machine learning based language model. The prompt is based on the natural language data analytics request. The prompt requests the machine learning based language model 240 to generate an execution plan for processing the natural language data analytics request. The system sends the prompt to the machine learning based language model, for example, by invoking an API (application programming interface) of the language model service 210. The system receives a response from the language model service 210. The response is generated by the machine learning based language model 240 by processing the prompt. The system processes the response to extract the execution plan from the response. Accordingly, the system generates 320 the execution plan for processing the natural language data analytics request based on a response received from the machine learning based language model;

The system iteratively refines the execution plan for processing the natural language data analytics request by performing steps including 330 and 340. The system provides the execution plan for display to the user, for example, the analyst. The analyst may review the execution plan and revise the natural language data analytics request to provide an updated natural language data analytics request. For example, if the execution plan uses a particular model M1 for performing a specific step of analysis, the user may specify via the natural language data analytics request to use a different model M2 instead of model M1. The models M1 and M2 may be statistical models or may be other kinds of models that perform specialized processing. The data analytics agent refines 340 the execution plan based on the natural language data analytics request using the machine learning based language model. The data analytics agent also generates the instructions for executing the model for processing the required step.

The system generates an updated prompt based on the updated natural language data analytics request and provides the updated prompt to the machine learning based language model 240. The system receives a response from the language model service 210. The response is generated by executing the updated response and includes an updated execution plan for processing the natural language data analytics request. The system extracts the updated execution plan from the updated response received from the machine learning based language model. The steps 330 and 340 may be repeated multiple times until the user approves the execution plan as being final.

According to an embodiment, the system configures and presents a user interface to the user describing the details of individual steps of the execution plan. The system receives feedback on individual steps from the user. For example, the data analytics agent 110 may have processed a particular step of analysis using a specific technique. The user may modify the natural language request to specify a different technique for performing that step of analysis. The system finalizes the execution plan after each step of the execution plan is approved by the user.

The system stores 350 the finalized execution plan for processing the natural language data analytics request obtained as a result of the iterative refinement of the execution plan. The system may generate several such execution plans for different natural language data analytics requests.

The execution plans may be accessed for processing the natural language data analytics requests that are received subsequently. For example, natural language data analytics requests may be included in a dashboard for display to a user. The dashboard may be updated periodically to display updated reports based on the natural language data analytics requests. Accordingly, the system repeats one or more times the steps 360 and 370. The system executes 360 the finalized execution plan to generate a report and sends 370 the generated report for displaying via a user interface.

According to an embodiment, the system saves sets of instructions that perform specific tasks that represent steps of execution plans. The saved sets of instructions are associated with the description of the step that they correspond to. This allows the system to reuse the sets of instructions. For example, a set of instructions for performing a particular step S1 of execution plan E1 of a natural language data analytics request R1 may be saved. Subsequently the system receives another natural language data analytics request R2. The system generates an execution plan E2 for the natural language data analytics request R2 and determines whether any step of the execution plan matches a step for which sets of instructions were previously generated and stored. If the system determines that a step S2 of the execution plan E2 matches the description of the step S2, the system reuses the set of instructions for step S1 for performing step S2. This reuse of sets of generated instructions allows efficiently generating execution plans and also provides consistency in results of execution of different natural language data analytics requests. For example, the machine learning based language model used for generation of instructions may be non-deterministic. As a result, the step S2 of execution plan E2 in the above example may use a different model for performing analysis compared to step S1 of execution plan E1. As a result, the results of execution of the two requests R1 and R2 may be significantly different even if the differences in the requests R1 and R2 are minor. The reuse of sets of generated instructions avoids such discrepancies across multiple executions of the same natural language data analytics requests as well as across executions of similar natural language data analytics requests.

Furthermore, the sets of instructions generated conform to constraints, for example, policy constraints of an organization requiring certain types of analysis to be performed using specific techniques or models. The reuse of sets of instructions that were previously approved results in ensuring that subsequent execution plans that reuse the set of instructions also conform to the constraints. This results in simplifying enforcement of policies across organizations.

Furthermore, reuse of sets of instructions previously generated is efficient since the machine learning based language model is not invoked for generating the set of instructions. Machine learning based language models are typically computationally intensive and use significant computational resources. Furthermore, if the machine learning based language model is executing on a separate server such as the language model service 210, the system also saves on network resources if the amount of data being transmitted to and from the language model service 210 is significant for generating the set of instructions for individual steps of the execution plan. As a result, the system saves on computational resources as well as networking resources by reusing the sets of instructions generated for steps across execution plans.

According to an embodiment, the prompt generated for the machine learning based language model is provided instructions in the prompt to generate instructions to invoke a set of instructions that was previously generated and stored. For example, if the set of instructions needs specific parameter values to interface with the rest of the execution plan, the machine learning based language model generates instructions for extracting the parameter values and providing them as input to the set of instructions being invoked. The machine learning based language model is provided with instructions in the prompt to generate instructions in the execution plan to receive any data or results generated by the set of instructions and provide them to a subsequent step of the execution plan.

According to an embodiment, the system generates prompts that ask the machine learning based language model to treat the stored set of instructions as inline code that is included in the execution plan without any modifications. Accordingly, the prompt generated for the machine learning based language model includes explicit instructions to not modify the set of previously generated instructions that are identified. The prompt provides instructions to the machine learning based language model to run the stored set of instructions without modifying them and to adjust the portions of the instructions that invoke the set of instructions to prepare the parameters passed as input to the set of instructions and appropriately set the parameter values before invoking the instructions.

The system further generates descriptions of the sets of instructions that are stored. The description acts as documentation of the sets of instructions. The system correlates the description of the set of instructions with steps of the execution plans and the natural language data analytics requests that resulted in generation of the execution plans. This provides documentation for the processes used in the organization, for example, business processes. The documentation describes how specific processing is performed in the organization. According to an embodiment, the system generates documentation for processes of an organization by collecting the descriptions of the various sets of instructions that are frozen and categorizing them based on the natural language data analytics requests. For example, the system may identify a category of natural language data analytics requests that invoke the same set of instructions and generate documentation describing how the category of natural language data analytics requests is processed in the organization. Furthermore, the documentation of the processes also supports standardization of the processes for the organization.

The system further determines whether two different natural language data analytics requests are processing the same step using different computations. This allows the system to determine whether different groups within the organization are consistently using the same technique for a particular step of analysis, for example, if they are using the same model for certain data analytics steps. The system can analyze the sets of instructions used by different natural language data analytics requests to determine whether any user or group within the organization does not conform to the policy constraints specified by the organization. As a result, the system helps enforce polices of the organization specifying how specific processes or process steps related to data analysis should be carried out within the organization.

Partially Materialized Execution Plans

According to an embodiment, the system generates partially materialized execution plans that include one or more sets of instructions that are identified as frozen. A machine learning based language model may include stochastic components that result in generation of non-deterministic outputs. As a result, a machine learning based language model may generate different responses each time the machine learning based language model is executed for the same input. A differ execution plan may be generated each time even if the same natural language data analytics request is processed using the same prompt that is provided as input to the machine learning based language model. As a result, the execution of the same natural language data analytics request at different times may return different results.

The system according to an embodiment, identifies a set of instructions (also referred to as code) of the execution plan generated from a natural language data analytics request and freezes the identified set of instructions so that they do not change when the execution plan is regenerated by the machine learning language based model for processing the same natural language data analytics request. Freezing a set of instructions of an execution plan is also referred to herein as materializing the set of instructions. The set of instructions that is materialized may also be shared across execution plans generated for other natural language data analytics requests.

Figure 4:
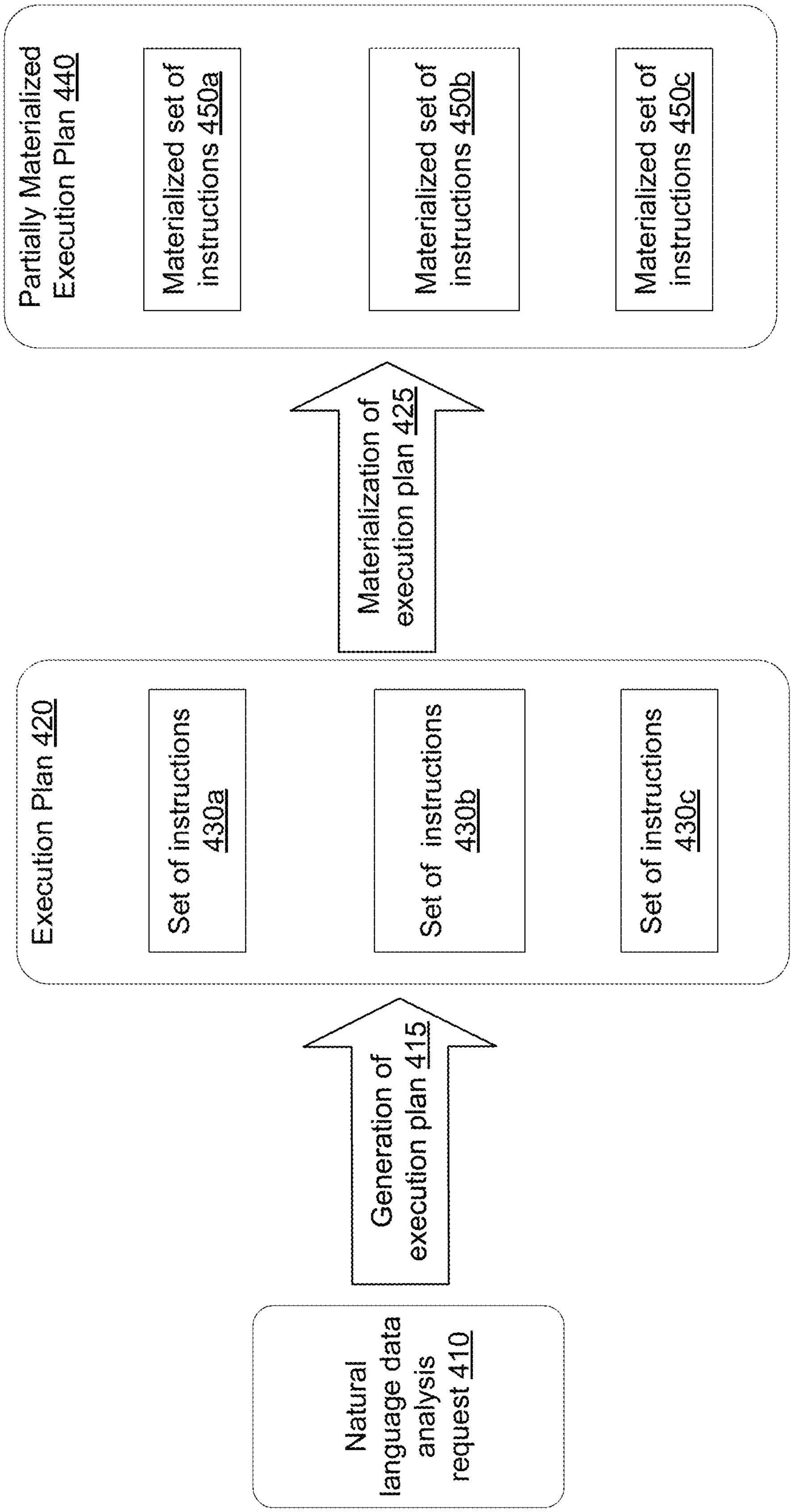
FIG. 4 illustrates partial materialization of an execution plan for a natural language data analytics request, according to an embodiment.

FIG. 4 illustrates partial materialization of an execution plan for a natural language data analytics request, according to an embodiment. The system receives a natural language data analytics request 410. The system generates 415 the execution plan for processing the natural language data analytics request 410. The system identifies one or more sets of instructions 430*a*, 430*b*, 430*c* for materializing. Materializing a set of instructions represents freezing the set of instructions so that the materialized set of instructions is not modified even if the machine learning based language model is executed again with the same input, even if the machine learning based language model has non-deterministic behavior. A materialized set of instructions may also be referred to herein as a frozen set of instructions or an immutable set of instructions.

For example, the sets of instructions may represent core computation of the execution plan that may have significant impact on the result of executing the execution plan. The system materializes 425 the execution plan 420 to obtain the materialized execution plan 440 by materializing each identified set of instructions 430*a*, 430*b*, 430*c* to obtain materialized sets of instructions 450*a*, 450*b*, 450*c* respectively. The system may not materialize all instructions of the execution plan 420, for example, instructions that are less critical to the computation of the result. The materialization of various sets of instructions may be performed iteratively, for example, as the system generates instructions for each step of the execution plan.

Figure 5A:
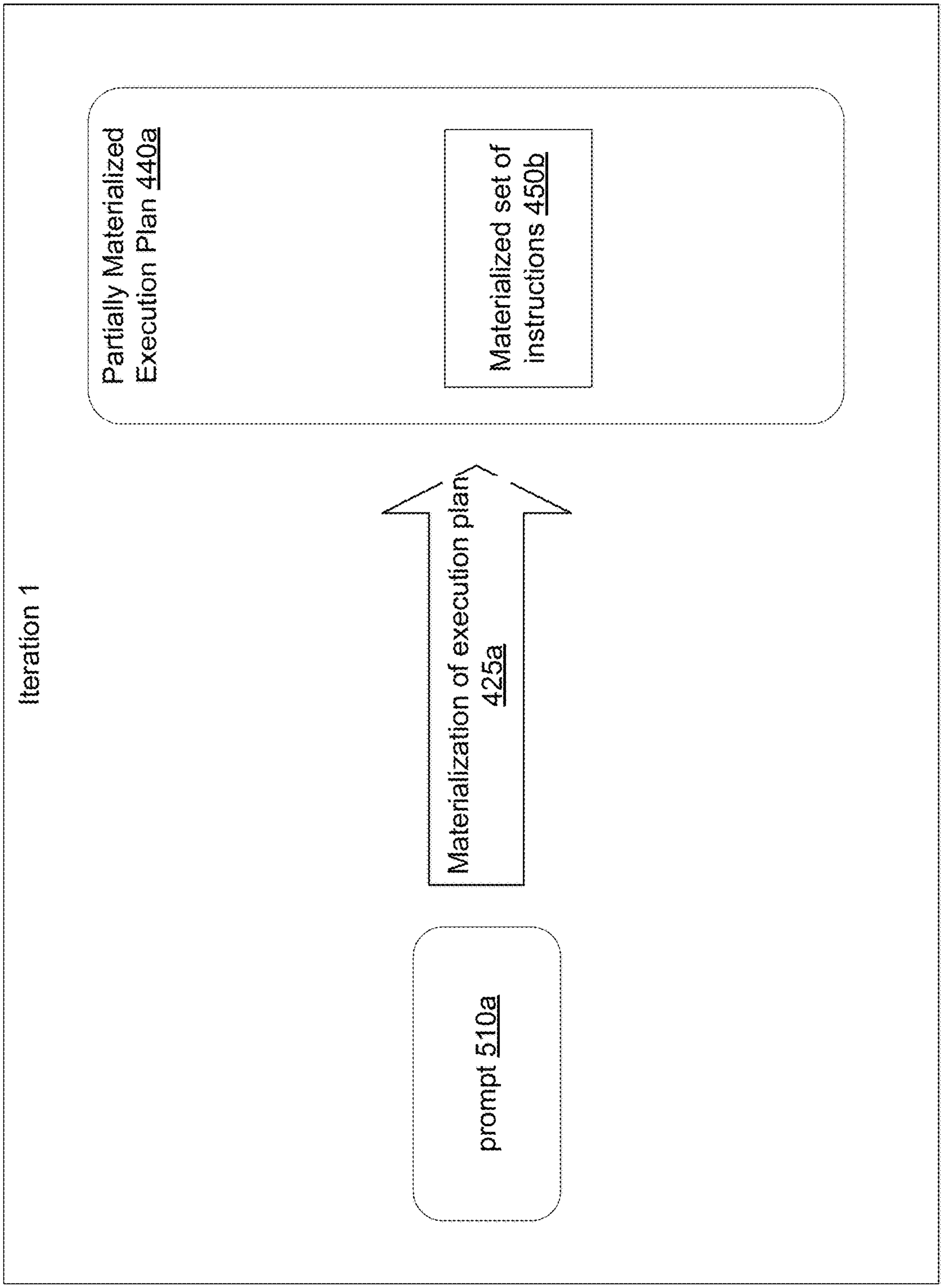
FIG. 5A shows an iteration of generation of partially materialized execution plan, according to an embodiment.
Figure 5B:
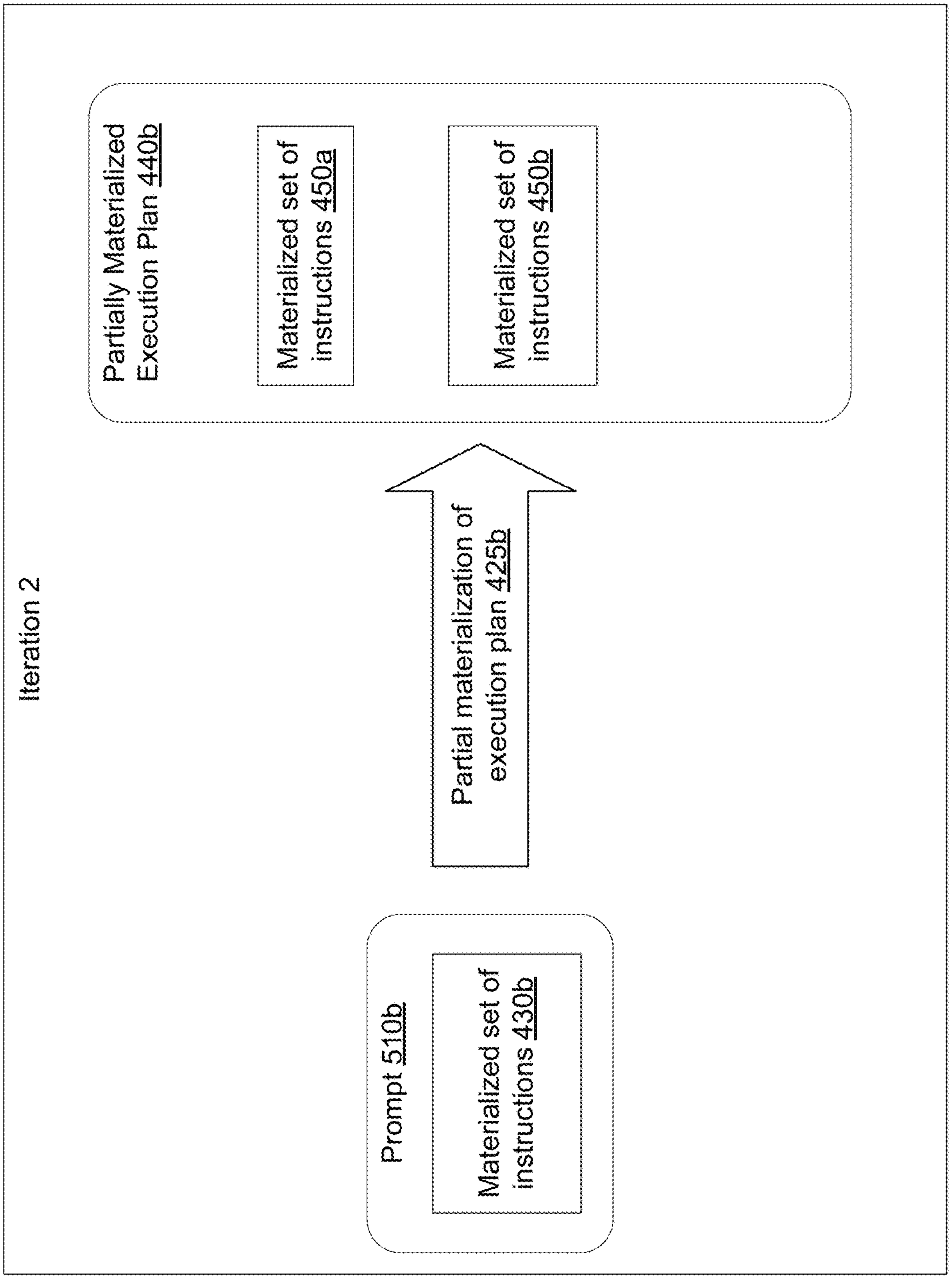
FIG. 5B shows a subsequent iteration of generation of partially materialized execution plan, according to an embodiment.
Figure 5C:
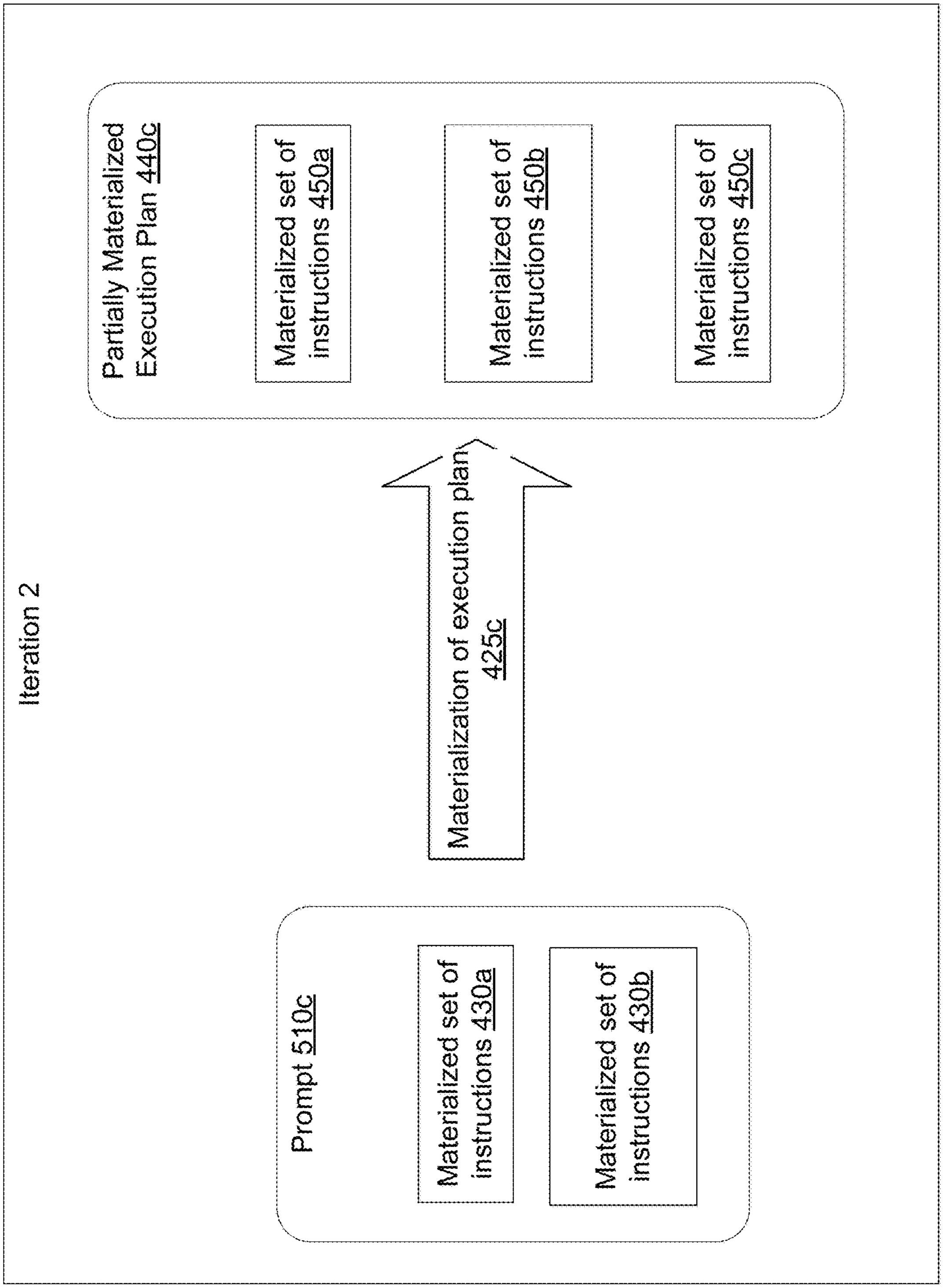
FIG. 5C shows another subsequent iteration of generation of partially materialized execution plan, according to an embodiment.

FIGS. 5A, 5B, and 5C illustrate partial materialization of an execution plan for a natural language data analytics request through iterative refinement, according to an embodiment.

FIG. 5A shows an iteration of generation of partially materialized execution plan, according to an embodiment. The system receives a natural language data analytics request 410 and generates a prompt including the natural language data analytics request. The system identifies a set of instructions to materialize and performs the materialization 425*a* to generate a partially materialized execution plan 440*a* that includes a materialized set of instructions 450*b*.

FIG. 5B shows a subsequent iteration of generation of partially materialized execution plan, according to an embodiment. During this iteration, the system generates a prompt that includes the natural language data analytics request 410 along with the materialized set of instructions 450*b*. The prompt further includes instructions for the machine learning based language model specifying that the materialized set of instructions 450*b* should not be modified. The prompt may further describe how to pass parameter values to the materialized set of instructions 450*b* for interfacing with the remaining instructions of the partially materialized execution plan 440*b*. The materialization step 425*b* may add another materialized set of instructions 450*a* to the partially materialized execution plan 440*b*.

FIG. 5C shows another subsequent iteration of generation of partially materialized execution plan, according to an embodiment. During this iteration, the system generates a prompt that includes the natural language data analytics request 410 along with all the currently materialized set of instructions including 430*a* and 430*b*. The prompt further includes instructions for the machine learning based language model specifying that the materialized set of instructions 450*a*, 450*b* should not be modified. The prompt may further describe how to pass parameter values to the materialized set of instructions 450*a*, 450*b* for interfacing with the remaining instructions of the partially materialized execution plan 440*b*. The materialization step 425*b* may add another materialized set of instructions 450*c* to the partially materialized execution plan 440*c*.

Figure 6:
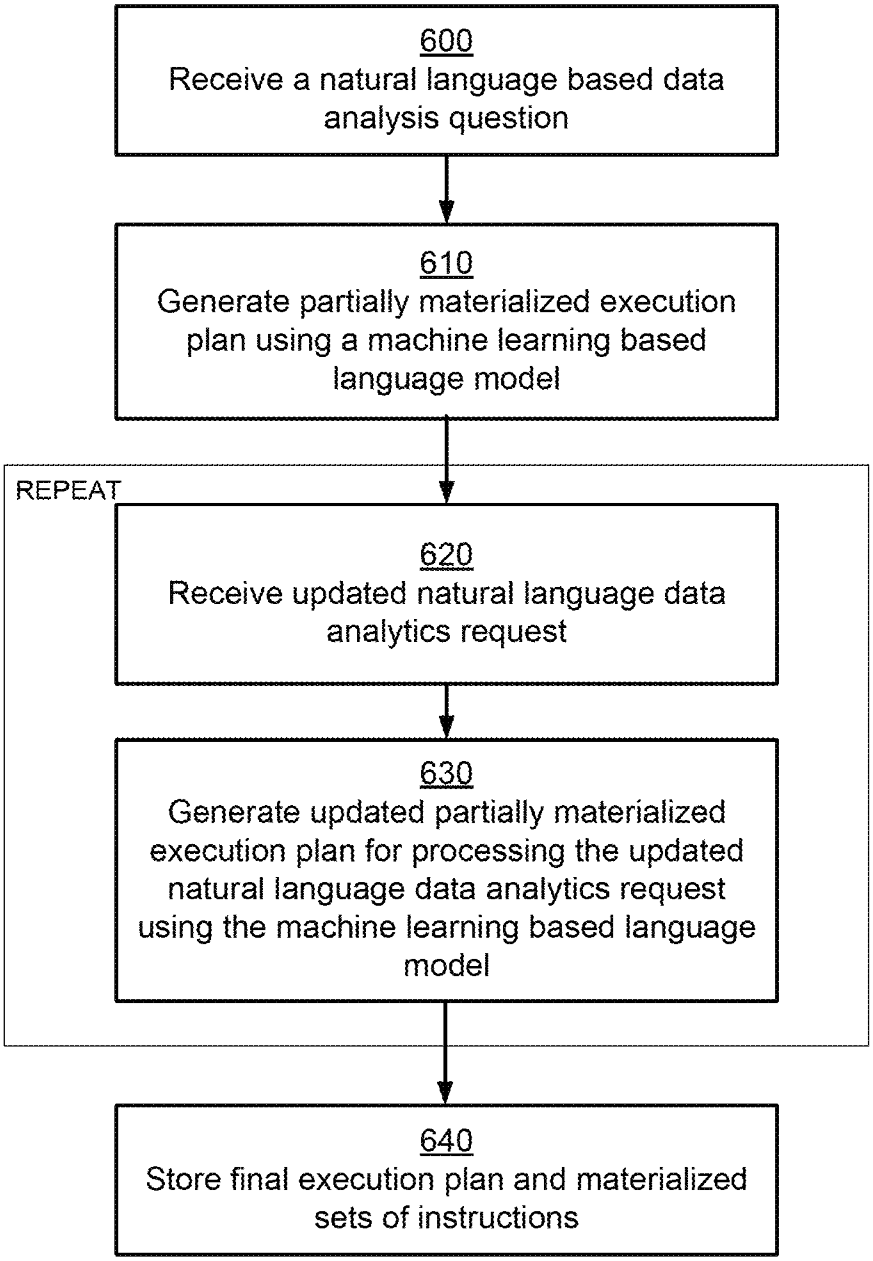
FIG. 6 is a flowchart illustrating a process for generating an execution plan for processing a natural language data analytics request, according to an embodiment.

FIG. 6 is a flowchart illustrating a process for generating an execution plan for processing a natural language data analytics request, according to an embodiment.

The system receives 600 a natural language data analytics request based on data stored in one or more data stores.

The system generates 610 a partially materialized execution plan for processing the natural language data analytics request using a machine learning based language model. The partially materialized execution plan comprises at least a set of instructions identified as materialized. A materialized set of instructions is unchanged if the partially materialized execution plan was regenerated from the natural language data analytics request using the machine learning based language model.

The system iteratively refines the partially materialized execution plan by repeatedly executing the steps 620 and 630. The system receives 620 an updated natural language data analytics request. The system generates 630 an updated partially materialized execution plan for processing the updated natural language data analytics request. The updated partially materialized execution plan is generated using the machine learning based language model and includes at least an additional set of instructions identified as materialized along with sets of instructions identified as materialized during previous iterations.

The system stores 640 a finalized execution plan obtained by iteratively refining the partially materialized execution plan. The system may execute the finalized execution plan to generate a report that may be displayed via a user interface, for example, a dashboard.

Generating partially materialized execution plans allows the system to display a consistent behavior in spite of use of machine learning based language models that may be non-deterministic. Furthermore, the materialized sets of instructions are reusable across execution plans, thereby allowing code reuse. The materialized sets of instructions represent core computations for an organization and the system uses machine learning based language models to generate documentation for the materialized sets of instructions. This documentation acts as the documentation of the core computations of the organization and codifies the polices of the organization. The system may further generate reports describing whether the materialized sets of instructions conform to policy constraints of the organization or if there are any discrepancies that need to be highlighted and fixed.

Determining Exposure of Datasets to Changes in Policy Constraints

According to an embodiment, the steps of the execution plan are implemented so as to satisfy certain constraints. The constraints may be specified as policy constraints. For example, an enterprise may have policies that a specific type of analysis is performed using a specific technique or a model. The constraint may specify that the model used for analyzing certain steps may depend on the context. For, the step may be performed using a particular model in one context and another model in a different context. The context may depend on the user performing the analysis, the group within the organization that is performing the analysis, a target system for which the analysis is being performed, and so on. The constraint may be based on resources that are available or resources being used for the analysis. For example, a model that uses lower resources may be preferred for a target system that has fewer computational resources.

Figure 7A:
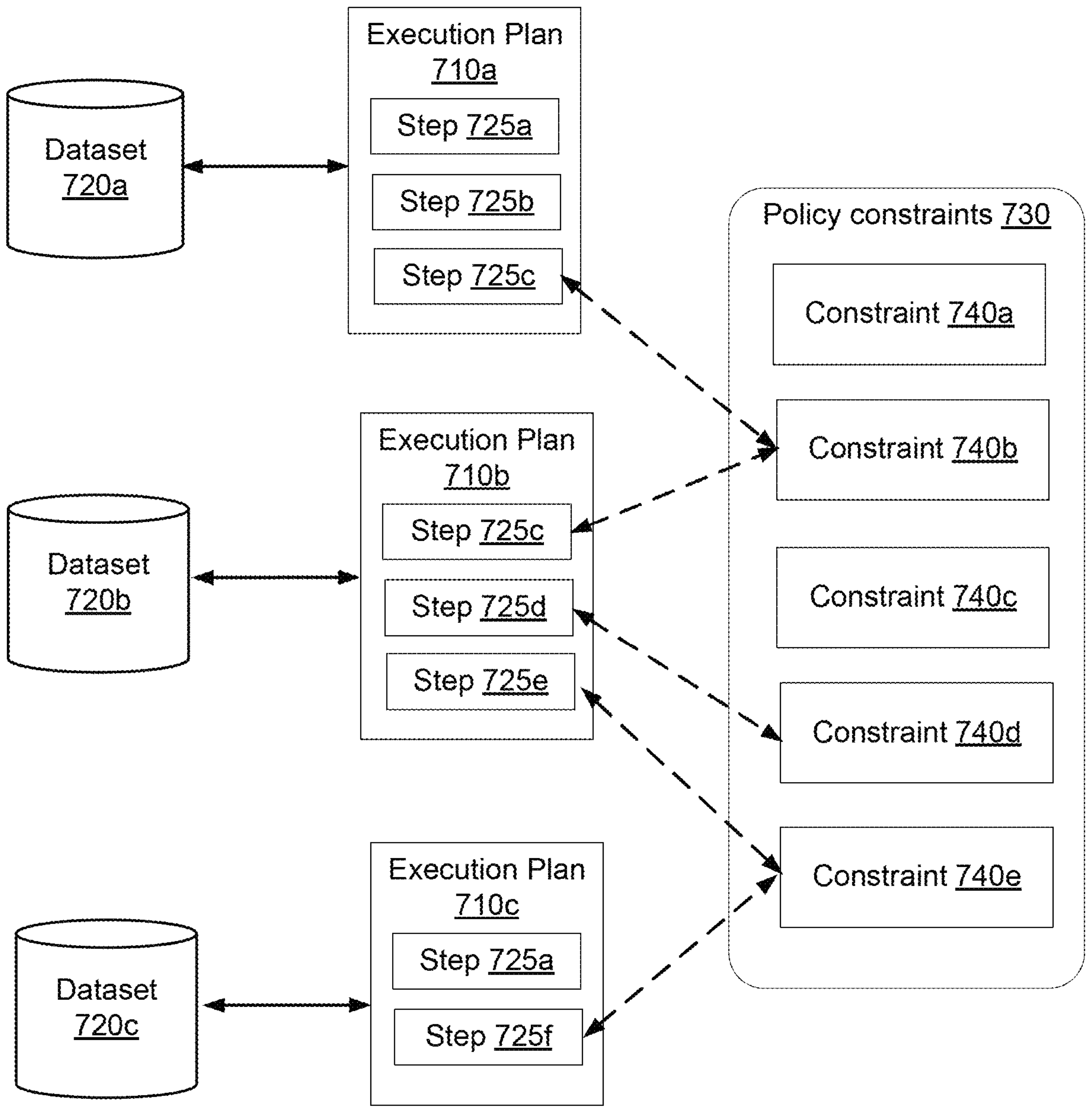
FIG. 7A illustrates the process of determining exposure of datasets to changes in policy constraints, according to an embodiment.

FIG. 7A illustrates the process of determining exposure of datasets to changes in policy constraints, according to an embodiment. FIG. 7A shows datasets 720*a*, 720*b*, 720*c*. Each dataset is generated by executing an execution plan. For example, the datasets 720*a*, 720*b*, 720*c* are generated by executing the execution plans 710*a*, 710*b*, and 710*c* respectively. Each execution plan is generated from a natural language data analysis request. Each plan comprises a set of steps. The set of instructions for a step may be reused across execution plans. For example, execution plan 710*a* includes steps 725*a*, 725*b*, and 725*c*; execution plan 710*b* includes steps 725*c*, 725*d*, and 725*e*; and execution plan 710*c* includes steps 725*a*, 725*f*. The instructions for step 725*c* are shared between execution plans 710*a* and 710*b*. Similarly, instructions for step 725*a* are shared between execution plans 710*b* and 710*c*.

The system stores policy constraints 730 including constraints 740*a*, 740*b*, 740*c*, 740*d*, and 740*e*. A constraint may be linked to a step of an execution plan if the constraint is applicable to the instructions of the step. As shown in FIG. 7A, constraint 740*b* is linked to step 725*c* of execution plan 710*a* and 710*b*; constraint 740*d* is linked to step 725*d* of execution plan 710*b*; and constraint 740*e* is linked to step 725*e* of execution plan 710*b* and step 725*f* of execution plan 710*c*. A dataset is linked to all the constraints that are linked to the steps of the execution plan used for creating the dataset. For example, dataset 720*a* is linked to constraint 740*b* since the constraint 740*b* is linked to step 725*c* of execution plan 710*a* used to create the dataset 720*a*. Dataset 720*b* is linked to constraint 740*b* since the constraint 740*b* is linked to step 725*c* of execution plan 710*b*; dataset 720*b* is linked to constraint 740*d* since the constraint 740*d* is linked to step 725*d* of execution plan 710*b*; dataset 720*b* is also linked to constraint 740*e* since the constraint 740*e* is linked to step 725*e* of execution plan 710*b*. Dataset 720*c* is linked to constraint 740*e* since the constraint 740*e* is linked to step 725*f* of execution plan 710*c*. These links between datasets and constraints can be used to determine the impact of a change in a constraint.

Figure 7B:
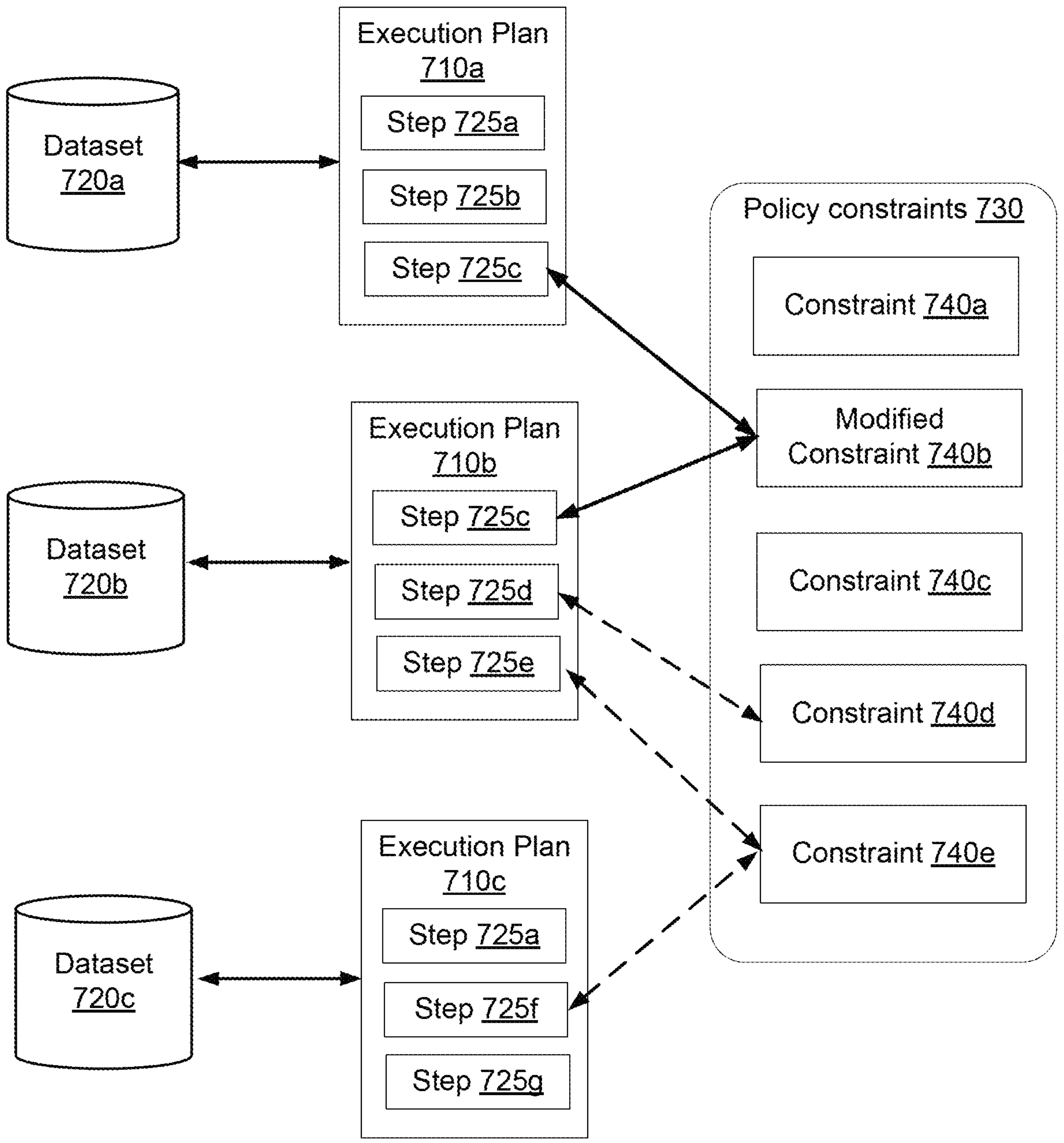
FIG. 7B shows that the constraint is modified or a request for modifying constraint 740*b* is received, according to an embodiment.

FIG. 7B shows that the constraint 740*b* is modified or a request for modifying constraint 740*b* is received, according to an embodiment. The constraint 740*b* is linked to step 725*c* of execution plans 710*a* and 710*b* which are linked to datasets 720*a* and 720*b* respectively. Modifying constraints 740*b* does not have any impact on the dataset 720*c*. Accordingly, the associations between datasets and constraints allow the system to identify which execution plans need to be regenerated and correspondingly, which datasets need to be rebuilt. This makes the process of modifying constraints efficient since only specific steps of execution plans need to be rebuilt and also only a subset of the dataset may have to be rebuilt. This makes the process of modifying policy constraints computationally efficient.

Figure 8:
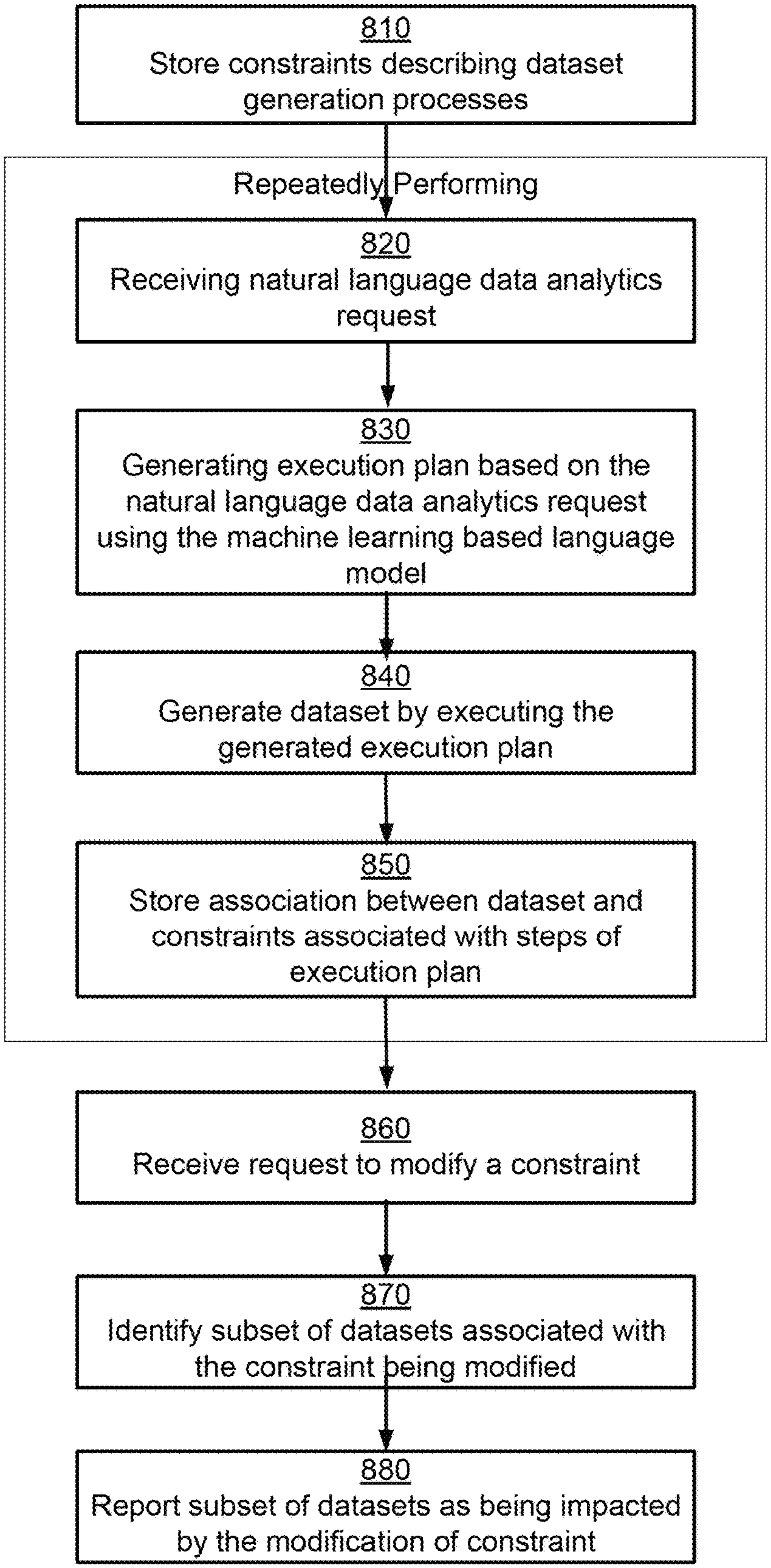
FIG. 8 shows a flowchart illustrating a process of determining exposure of datasets to changes in policy constraints, according to an embodiment.
Figure 9:
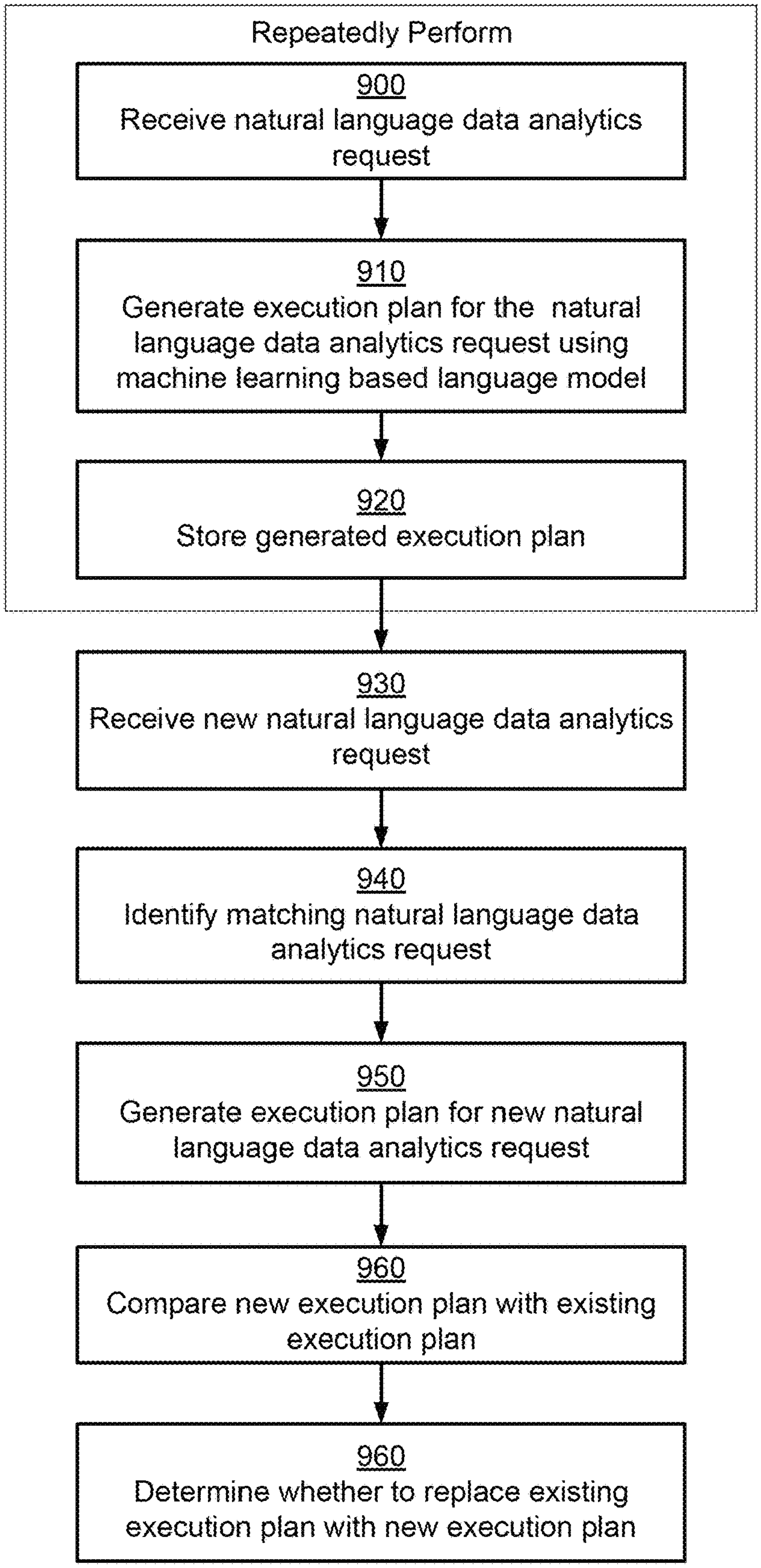
FIG. 9 shows a flowchart illustrating a process of in-context learning for data analytics agents, according to an embodiment.

FIG. 8 shows a flowchart illustrating a process of determining exposure of datasets to changes in policy constraints, according to an embodiment. The steps shown in FIG. 9 are performed by various modules of the online system 200. The steps may be performed in an order different from that indicated herein.

The system stores 810 a set of constraints associated with datasets of an organization. These constraints may represent policies of the organization. A constraint may be referred to as a policy constraint. A set of policy constraints form a policy of the organization. Each constraint may describe a step performed for creating a dataset. For example, a constraint may specify that only a specific type of model may be used for certain analysis steps. As another example, a constraint may specify that a certain type of analysis must be performed using a specific analysis technique or algorithm.

The system generates a plurality of datasets by processing each of a plurality of natural language data analytics requests using steps 820, 830, 840, and 850. The system receives 820 a natural language data analytics request based on data stored in one or more data stores. The system generates 830 an execution plan for processing the natural language data analytics request using a machine learning based language model, the execution plan comprising a set of steps. Each step comprises a set of instructions. One or more steps of the execution plan are associated with a constraint of the set of constraints. For example, if a constraint specifies use of a particular type of technique for a particular type of operation and the step performs that particular type of operation, the system associates the step with the constraint. The system may associate steps with constraints based on user feedback. Alternatively, the system determines that a step should be associated with a constraint based on matching of the description of the step and the description of constraints and confirms with a user whether the association is accurate. If confirmed, the system stores a link describing the association.

The system generates 840 the dataset by executing the execution plan and storing an association between the dataset and the constraint. The system also stores 850 an association between the dataset and constraints associated with steps used the create the dataset.

The system receives 860 a request to replace a constraint with a modified constraint. This step represents a potential policy change of the organization, for example, if a decision is made to use a model M2 instead of model M1 that is currently being used. The system identifies 870 a subset of datasets that are associated with the constraint based on the links between the constraints and the datasets. The system sends information describing the subset of datasets as datasets impacted by modification of the constraint. This information represents the exposure of the datasets to a potential modification to a policy constraint.

If the exposure of the change is large, i.e., the number of impacted datasets is above a threshold, the system may automatically determine not to make the modification of the policy constraint. Alternatively, a user may make the decision and provide the decision to the system by blocking the policy constraint modification.

Alternatively, the system or a user may make a decision to proceed with the policy constraint modification. The system assists with regeneration of the datasets impacted by the change in policy constraint. Accordingly, for each dataset impacted by the modification of the constraint, the system identifies the execution plan used to generate the dataset. The system identifies one or more steps of the execution plan used to generate the datasets that are associated with the constraint. The system regenerates instructions of at least the one or more steps of the execution plan using the machine learning based language model.

In-Context Learning Based Data Analytics Agents

According to an embodiment, the system performs in-context learning to generate data analytics agents for different contexts. For example, an organization, an enterprise, or even an individual user may be a tenant (or a customer) of the online system. The in-context learning may be performed for a tenant or customer of the online system. The in-context learning helps the online system generate execution plans that are specific to the context of a customer. The online system learns from the past analysis performed by users, e.g., employees of an organization to continuously refine and improve execution plans.

According to an embodiment, a data analytics agent is specialized for interacting with a specific type of data source, for example, a relational database or a document database. A data analytics agent may be specialized for a specific domain, for example, a vertical industry. The system simplifies the process of training a data analytics agent via in-context learning. A user, for example, a domain expert may use the system to process several context specific natural language data analytics questions. The system prompts the user for every execution plan being generated. The user responses guide the system to generate information specific to the data analytics agent including execution plans that are appropriate for a given context. The execution plans and their natural language data analytics equations as well as their instructions or code is stored. A software artifact may be generated based on the information generated for the data analytics agent. The software artifact may be deployed in specific contexts and allows other users to use the context specific data analytics agent.

FIG. 9 shows a flowchart illustrating a process of in-context learning for data analytics agents, according to an embodiment. The steps shown in FIG. 9 are performed by various modules of the online system 200. The steps may be performed in an order different from that indicated herein.

The system performs in-context learning of data analytics agents by generating execution plans for natural language data analytics requests specific to the data agent. A user provides several natural language data analytics requests relevant to the context for which the data analytics agent is being trained. Multiple users may provide feedback during various phases including planning phase, execution phase, and result analysis phase. The planning phase performs generation of an execution plan for natural language data analytics requests. User feedback is obtained to confirm various steps of the execution plan that are generated. Certain steps of the execution plan may be regenerated based on the user feedback. Alternatively certain portions of the execution plan may be determined to be finalized based on user confirmation. The execution phase performs execution of the execution plans of the natural language data analytics requests. User feedback is also provided for result analysis phase. After execution of the execution plan, the system finalizes and presents results. User feedback is obtained for the accuracy of results as well as the presentation of the results. For example, the presentation of the results may be modified based on user feedback. Th system may generate a particular type of graph for displaying the results. If the user feedback indicates that the presented graph is inadequate or not preferred by the user, the system may regenerate the results in a different form, for example, a different type of graph or present the results in a different format, for example, in a table form. Once the presentation of result is approved by a user, the system may reuse the same presentation style in similar contexts, for example, for similar reports that may be generated. The system may store a mapping from categories of reports to the types of presentation styles approved by users over time. The system uses the mapping to determine the presentation style for new reports. For example, the system may match a new report with existing reports or categories of reports that were previously finalized. The system identifies the closest matching report and uses the presentation style that was previously used for the matching report or for reports of a matching category. The system may match reports by generating a vector representation of descriptions of reports and performing a vector comparison, for example, based on cosine similarity or certain vector distance metric. The system may generate a vector representation for a description of report based on the natural language description received for generating the report. The system may include information describing the execution plan of the report to generate the vector representation from information describing the report. Explicit feedback provided by users as well as implicit feedback is used for evaluating the new execution plan to determine whether it should replace an existing execution plan.

The system generates a plurality of execution plans by repeating the steps 900, 910, 920 for each of a plurality of natural language data analytics requests. The system receives 900 a natural language data analytics request. The system generates 910 an execution plan for processing the natural language data analytics request using a machine learning based language model. According to an embodiment, the system generates 910 the execution plan by generating a prompt that specifies the natural language data analytics request and requests a machine learning based language model 240 to generate the execution plan for the natural language data analytics request. The system receives a response obtained by executing the machine learning based language model 240 and extracts the execution plan from the response. The system stores 930 the generated execution plan and corresponding sets of instructions in association with the natural language data analytics request.

The system receives 930 a new natural language data analytics request. The system matches the new natural language data analytics request against each of the plurality of natural language data analytics requests to identify 940 a matching natural language data analytics request. According to an embodiment, the system generates vector embeddings for the new natural language data analytics request and compares the vector embeddings against vector embeddings of natural language data analytics requests that were previously processed. The system selects a matching natural language data analytics request based on vector distances between vector embeddings for the new natural language data analytics request vector embeddings of natural language data analytics requests that were previously processed. For example, the system may compare the vector distances with a threshold value to determine whether the two vector embeddings match.

The system generates 950 an execution plan for processing the new natural language data analytics request. The system uses a prompt for requesting the machine learning based language model to generate an execution plan for the new natural language data analytics request. The prompt specifies the new natural language data analytics request and also provides the execution plan of the matching natural language data analytics request for guidance. According to an embodiment, the prompt also specifies the matching natural language data analytics request. According to an embodiment, the prompt also specifies the instructions generated for the execution plan of the matching natural language data analytics request. The additional information helps the machine learning based language model generate the execution plan for the new natural language data analytics request.

It is possible that the new execution plan generated uses techniques that are superior to the execution plan of the matching natural language data analytics request. The system compares the execution plan of the new natural language data analytics request with the execution plan of the matching natural language data analytics request based on feedback received for each execution plan. According to an embodiment, the comparison is based on feedback received by the system for execution of different execution plans.

The system may receive explicit feedback from users. For example, during various steps of generation of execution plan or during execution of the execution plan, the system may present questions to the user and receive feedback based on user responses. The system aggregates feedback across various questions presented to the user and also across multiple users providing feedback.

The system may receive implicit feedback, for example, based on a number of users that execute the execution plan or based on execution efficiency of the execution plan. The system may generate a metric describing the feedback, for example, as a weighted aggregate of different types of feedback received.

The system determines whether to replace the execution plan of the matching natural language data analytics request with the execution plan of the new natural language data analytics request based on the feedback. For example, if the system determines that the new execution plan is superior, the system may replace an existing execution plan of a matching new natural language data analytics request with the new execution plan. According to an embodiment, the system replaces the existing execution plan by regenerating the existing execution plan using a prompt that provides the existing natural language data analytics request and the new execution plan and request the machine learning language model to generate an execution plan for the existing natural language data analytics request using the new execution plan for guidance.

According to an embodiment, the system executes the execution plan of the new natural language data analytics request to generate a report and sends the report for displaying via a user interface. According to an embodiment, the user interface for displaying the report is a dashboard. The system may execute the execution plan of the new natural language data analytics request to generate a report and sending the report for displaying via a user interface are performed based on a predetermined schedule for displaying the report on the dashboard.

According to an embodiment, the execution plan of the new natural language data analytics request incorporates one or more sets of instructions from the execution plan of the matching natural language data analytics request. Each of the one or more sets of instructions is marked as materialized.

Applications

The techniques disclosed herein may be used by enterprises to generate reports. The data analytics agent 110 may be used by a data analyst to generate reports based on activities of the enterprise. For example, a user may request a report showing an impact of a previous action taken in the enterprise, such as a change of number of employees, reorganization of a certain group, and so on. The natural language request may be for analyzing the results of actions taken by an enterprise or reanalyzing the results in view of changes, for example, changes caused by external factors. The reports may be related to financial aspects of an enterprise but are not limited to financial aspects and are applicable to other domains, for example, instrumentation of equipment, analysis of sensor data, analysis of user data, and so on.

Figure 10A:
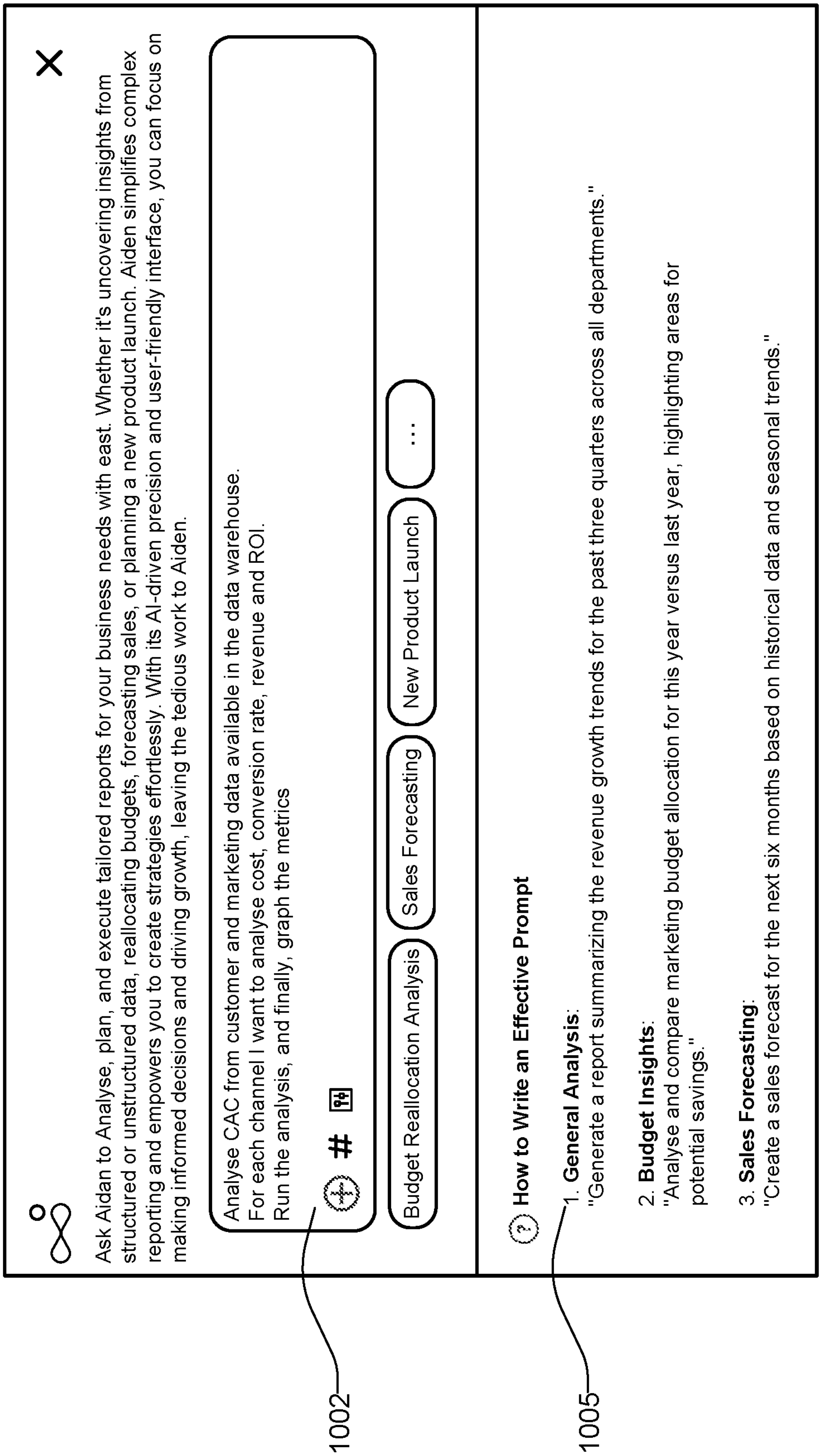
FIG. 10A shows a screenshot of a user interface for allowing a user to input a natural language data analytics request, according to an embodiment.

FIG. 10A shows a screenshot of a user interface for allowing a user to input a natural language data analytics request, according to an embodiment. The user interface displays one or more example natural language data analytics requests 1005 that a user can provide. The user interface displays a widget, for example, a text input box that allows users to enter a natural language data analytics request for the data analytics agent 110 to analyze.

Figure 10B:
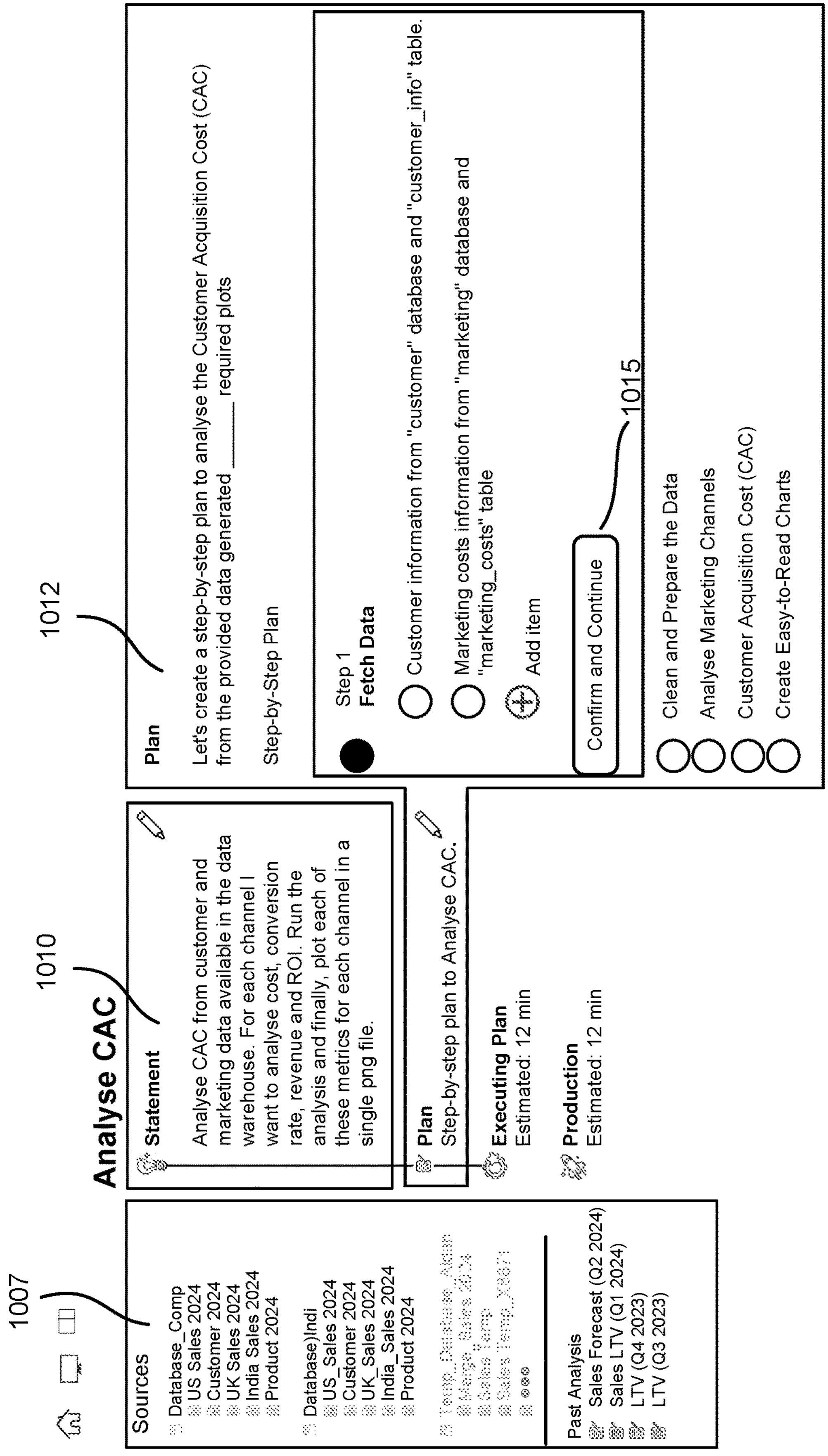
FIG. 10B shows a screenshot of a user interface for displaying steps of an execution plan and receiving feedback on the execution plan, according to an embodiment.

FIG. 10B shows a screenshot of a user interface for displaying steps of an execution plan and receiving feedback on the execution plan, according to an embodiment. The user interface shown in FIG. 10B may be shown to a user after the user has provided a natural language data analytics request as shown in FIG. 10A. The user interface shows various data sources 1007 against which natural language data analytics requests may be processed. The user interface also shows the natural language data analytics request 1010 that is currently being processed. The user interface shows steps of the execution plan 1012. For example, the execution plan illustrated in FIG. 10B shows steps including (1) fetch data, (2) clean and prepare data, (3) analyze marketing channels, (4) determine customer acquisition costs, and (5) create easy to read charts. For each step of the execution plan, the user interface may receive feedback 1015 from user, for example, to verify information related to the step such as the type of model or process used for processing the step. For example, if the system determines that a particular technique should be used to conform with policy constraints for a particular step, the system may confirm with the user if the user approves the choice of the technique. The system may receive other types of feedback to evaluate the execution plan. The system may aggregate feedback received for different steps of the execution plan as well as feedback received across multiple users to generate a metric for evaluating the execution plan. The metric used for evaluating the execution plan is used for in-context learning for training the data analytics agent using the natural language data analytics requests. The system may decide based on the metric generated from the feedback, whether the execution plan is better than an existing execution plan and whether the existing execution plan should be regenerated based on the new execution plan.

Figure 10C:
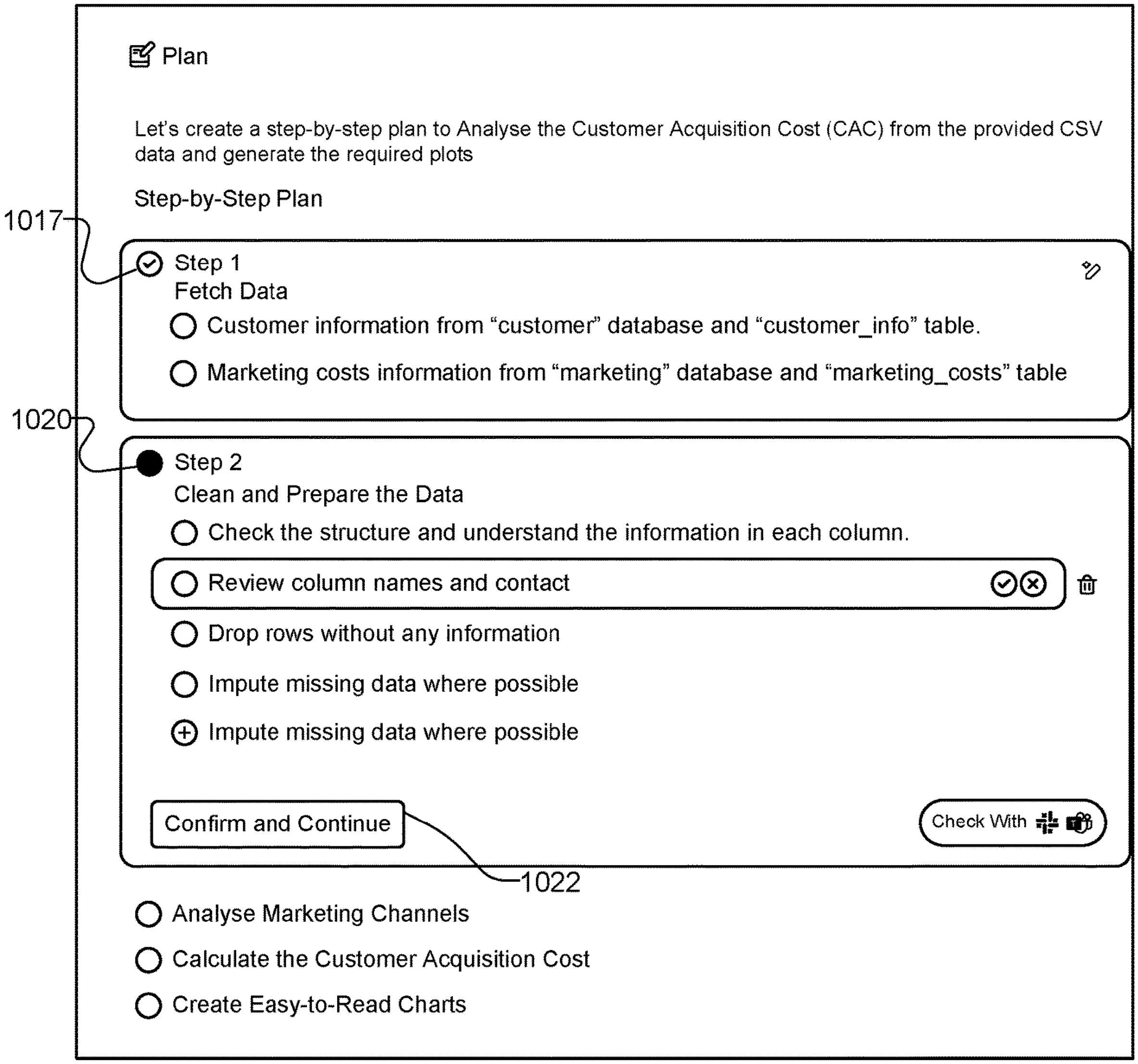
FIG. 10C shows another screenshot of a user interface for displaying steps of an execution plan and receiving feedback on the execution plan, according to an embodiment.

FIG. 10C shows another screenshot of a user interface for displaying steps of an execution plan and receiving feedback on the execution plan, according to an embodiment. As shown in the user interface of FIG. 10C, the step 1017 to fetch data indicates that the user feedback is received for the step and the step is approved by the user. The system receives feedback for the next step 1020 to clean and prepare the data. The system determines various options for each step and configures the user interface to display the options, thereby allowing the user to select a particular option. The system may select the best option and choose that option as a default value. For example, for the step to clean and prepare the data, the system displays various options including (1) checking the structure and analyzing the information in each column, (2) reviewing column names and content, (3) dropping rows that do not have any information, (4) imputing missing data where possible, and so on. A user may be allowed to select multiple cleaning and preparing steps. After making one or more selections, the user is requested to confirm and continue using a submit button 1022.

Figure 10D:
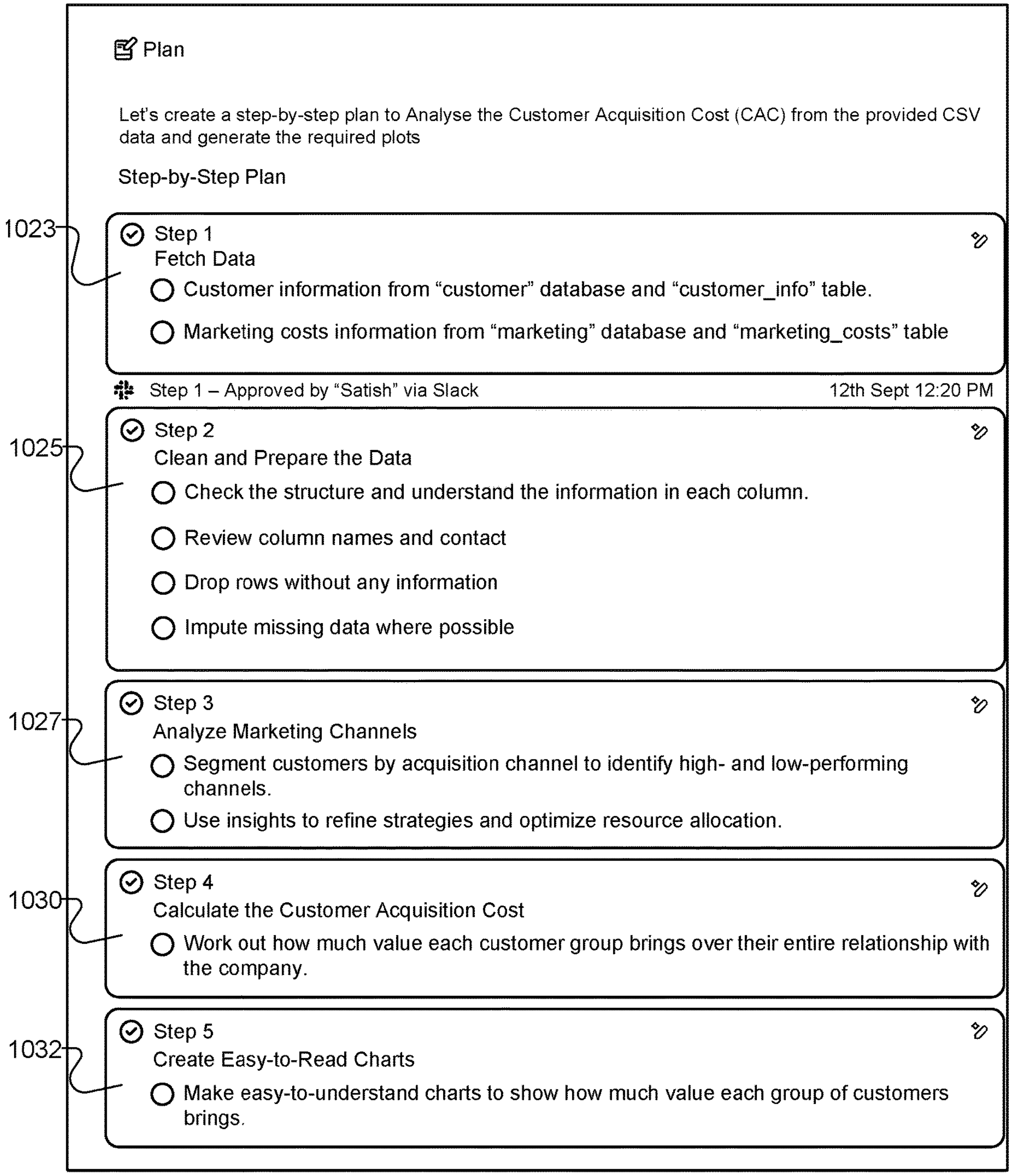
FIG. 10D shows another screenshot of a user interface displaying execution of the various steps of the execution plan, according to an embodiment.

FIG. 10D shows another screenshot of a user interface for displaying steps of an execution plan and receiving feedback on the execution plan, according to an embodiment. As shown in FIG. 10D, the user feedback is received for all steps 1023, 1025, 1027, 1030, and 1032 of the execution plan. Once the execution plan is approved, the execution plan may be executed.

Figure 10E:
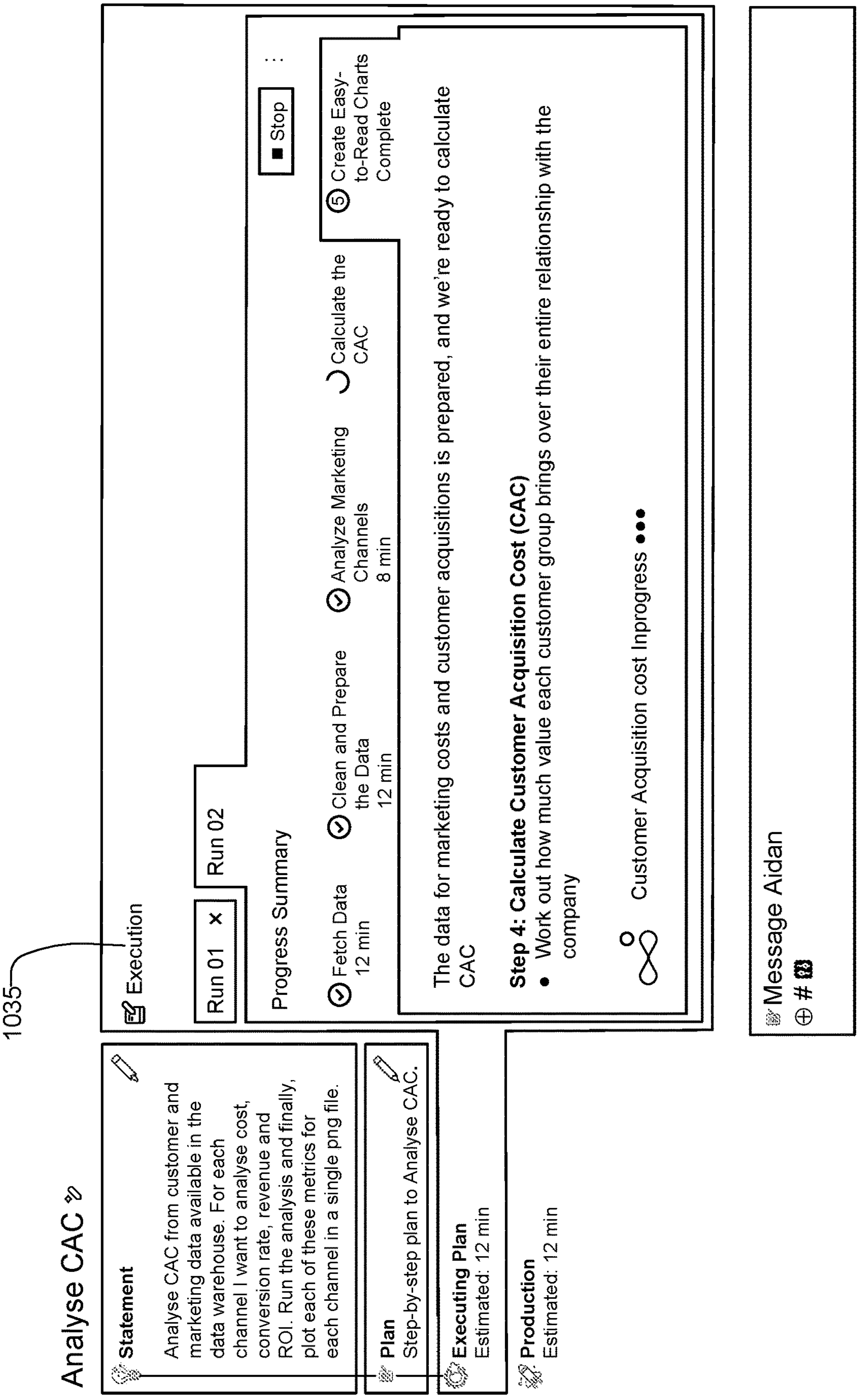
FIG. 10E shows another screenshot of a user interface for displaying steps of an execution plan and receiving feedback on the execution plan, according to an embodiment.

FIG. 10E shows another screenshot of a user interface displaying execution of the various steps of the execution plan, according to an embodiment. The system may display the current state 1035 of execution by providing information of the step being currently executed. The system may monitor the performance of each step. According to an embodiment, the performance of a particular step may be used to generate implicit feedback which is used to evaluate the execution plan or a particular step of the execution plan. The system may decide whether to regenerate a previously generated and stored execution plan based on the implicit feedback. For example, the system may generate a prompt that describes the particular step or the entire execution plan that is performing efficiently and provides the prompt to the machine learning based language model with a request to regenerate a stored execution plan for a previously processed natural language data analytics request.

Figure 10F:
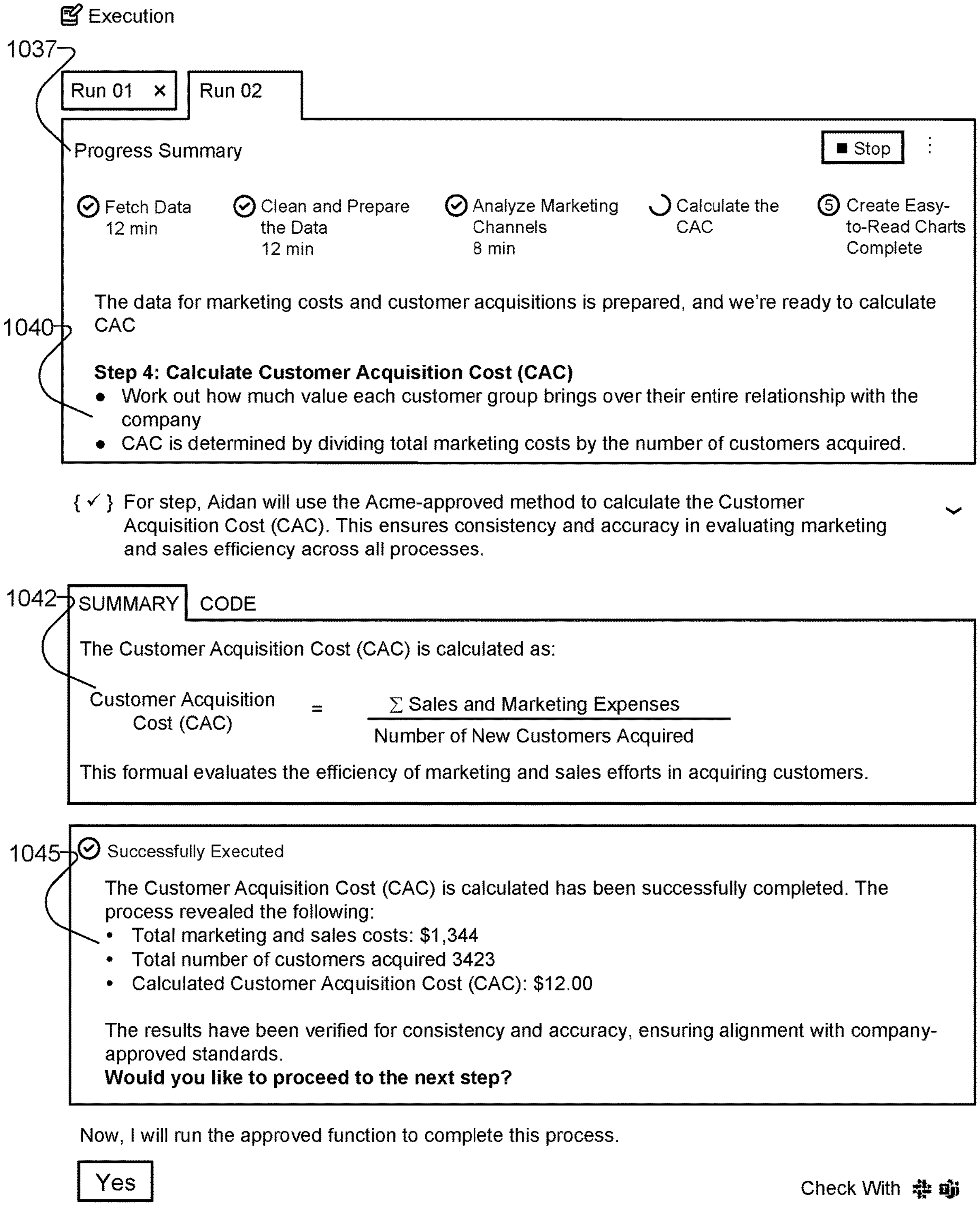
FIG. 10F shows another screenshot of a user interface for displaying details of execution of a particular step of an execution plan, according to an embodiment.

FIG. 10F shows another screenshot of a user interface for displaying details of execution of a particular step of an execution plan, according to an embodiment. For example, the user interface shows a progress summary 1037 comprising details of the step of performing a data analytics operation such as calculating customer acquisition cost. The information includes the details 1040 of the step describing the technique used for performing the step. The details may provide specific information such as details of a model used for processing the step, any computations performed as part of executing the step, and so on. The information describing the execution of the step further includes a status 1045 of execution, for example, status indicating whether the execution was successful as well as the results of the computation performed.

Figure 10G:
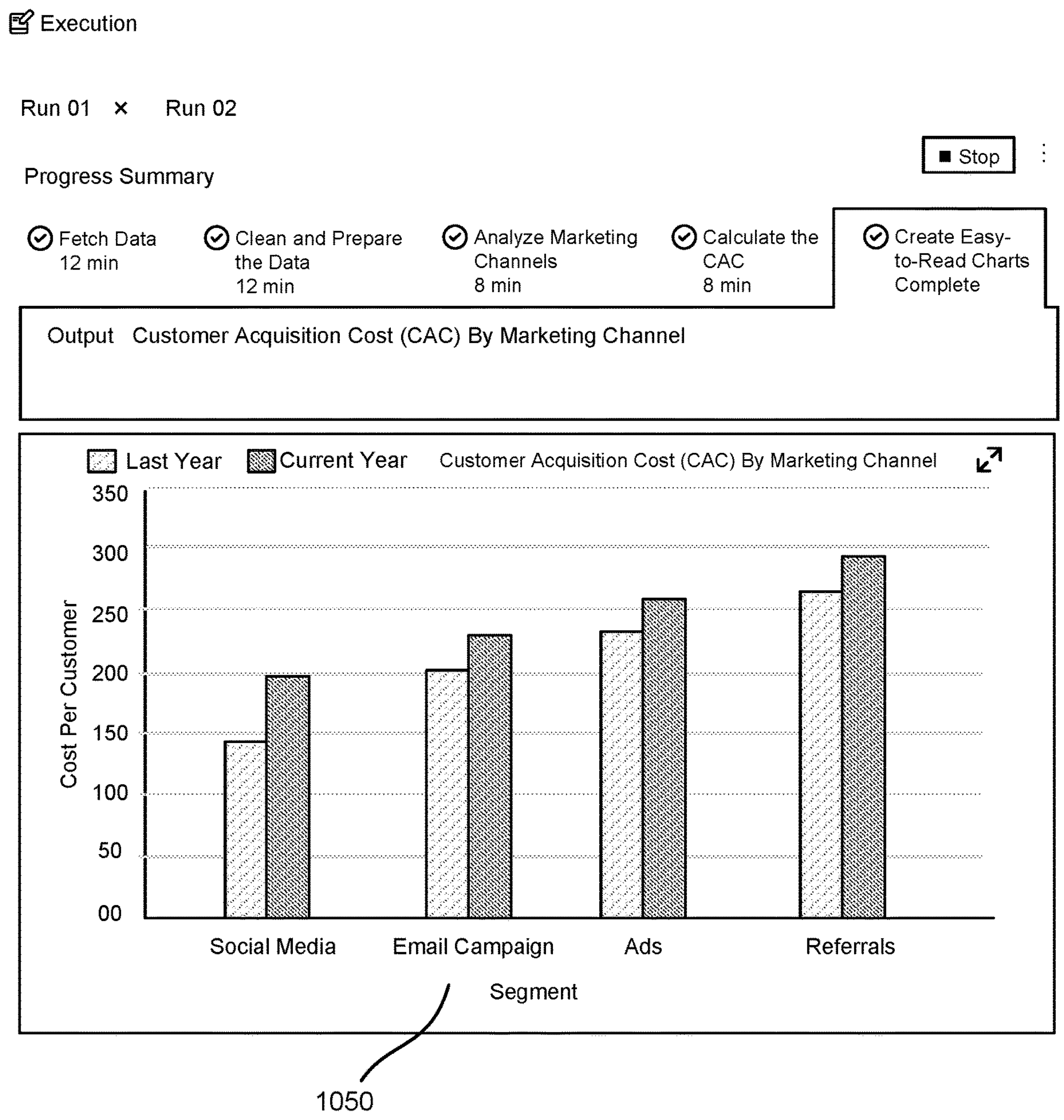
FIG. 10G shows another screenshot of a user interface for displaying the result of execution of the entire execution plan, according to an embodiment.

FIG. 10G shows another screenshot of a user interface for displaying the result of execution of the entire execution plan, according to an embodiment. For example, if the execution plan is for a natural language data analytics request for visualization of a certain report, the system configures a user interface and displays the visualization.

Figure 10H:
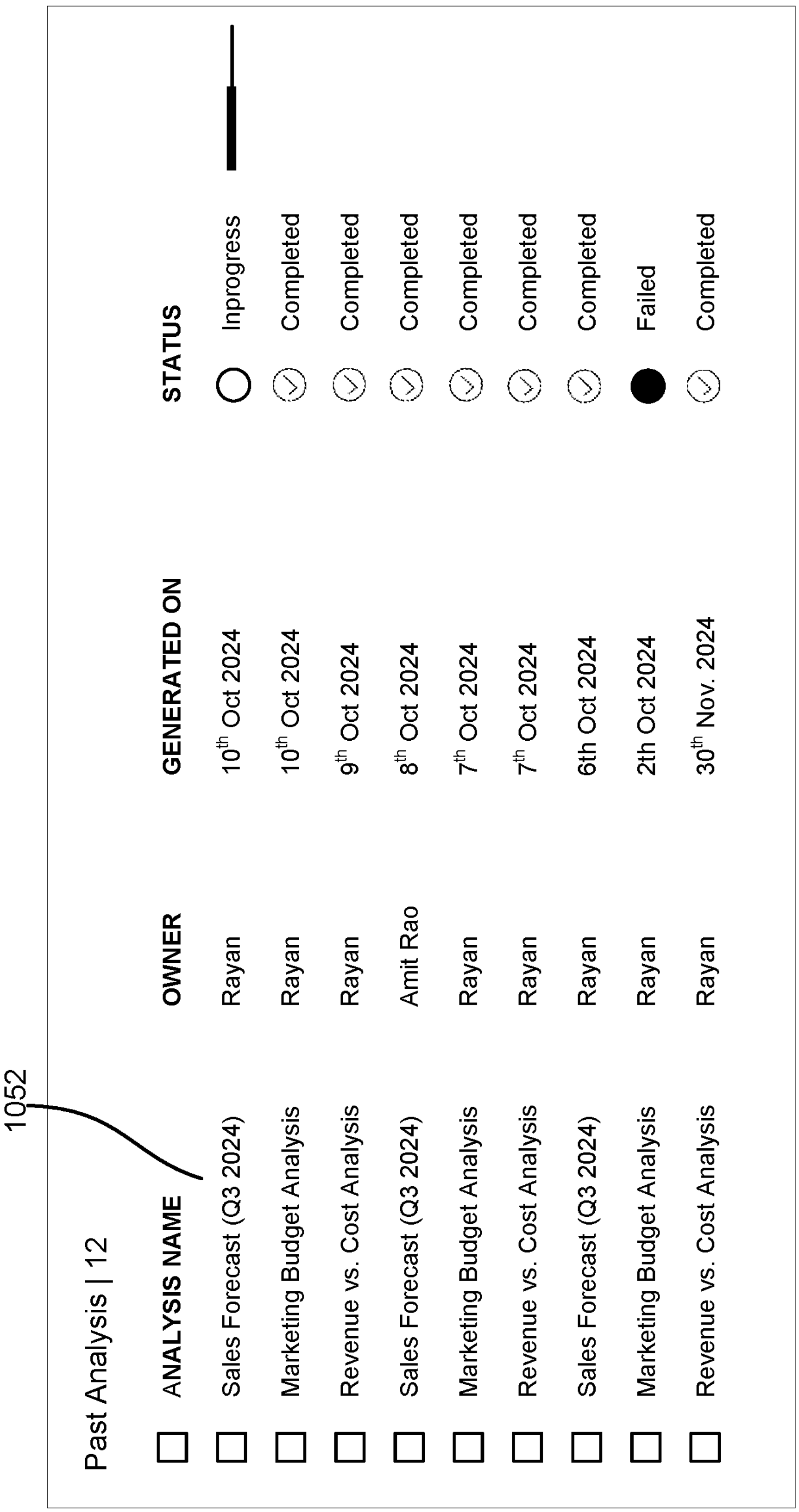
FIG. 10H shows another screenshot of a user interface for displaying past results of execution of natural language data analytics requests, according to an embodiment.

FIG. 10H shows another screenshot of a user interface for displaying past results of execution of natural language data analytics requests, according to an embodiment. For example, if the user executed multiple natural language data analytics requests, the system shows the status of execution of each instance indicating when the execution was performed, the status of execution, and so on.

Technical Improvements

The techniques disclosed improve the efficiency of execution of analytics reports based on data stored in heterogeneous data stores. The system allows generating context specific data analytics agents that are trained to perform efficiently in specific contexts, for example, for specific types of data sources or for specific vertical industries. The context specific data analytics agents are generated simply by using the system to process several natural language data analytics requests and answering questions generated by the system to guide the system through generation of execution plans. The context specific data analytics agents may be generated without adjusting parameters of a machine learning model. As a result, generation of the data analytics agents is an efficient process compared to training a machine learning based model using gradient descent technique or another technique that adjusts the parameters of the model.

A machine learning based language model may include stochastic components that result in generation of non-deterministic outputs. As a result, a machine learning based language model may generate different responses each time the machine learning based language model is executed for the same input. A different execution plan may be generated each time the machine learning based language model is executed even if the same natural language data analytics request is processed using the same prompt that was previously provided as input to the machine learning based language model. This is a technical problem specific to machine learning based language models that are non-deterministic. The techniques disclosed provide a technical solution to this problem by marking sets of instructions as materialized and modifying the prompts to ensure that the materialized sets of instructions are not changed across executions of the machine learning based language model, even if the remaining execution plan is changed. The processes described herein incrementally mark sets of instructions as materialized as the execution plan is iteratively refined, thereby making the output of the machine learning based language model deterministic at least for specific portions of the execution plans that may be critical to generating the answer. This allows the execution plans to generate consistent reports even if regenerated. A non-deterministic output of reports may not be acceptable for several applications or problem domains.

Furthermore, the materialized sets of instructions of execution plans may be reused across execution plans, thereby allowing new natural language data analytics requests to be processed efficiently and perform data processing in a manner that is consistent with previously generated reports. For example, if a natural language data analytics request is modified to change certain parts of the data analysis, the system ensures that the remaining parts of the data analysis use stored sets of instructions that were marked as materialized. That way the generation of the execution plan for the new natural language data analytics request is efficient due to reuse of the computational effort that was previously performed. Furthermore, the result of execution of the new natural language data analytics requests based on the new execution plan is consistent with previously executed natural language data analytics requests in spite of variations in the requests. For example, a change in one step of the analysis does not cause a nondeterministic machine learning based language model to generate a different execution plan that uses different sets of instructions for individual steps compared to previously generated sets of instructions.

The system further provides a representation for storing instructions representing policy constraints of an organization. The system provides a mechanism to efficiently determine the impact of changing policy constraints for an organization. Conventional techniques are unable to accurately determine the impact of making changes to policy constraints, thereby resulting in significant consumption of resources in enforcing the changes. The system allows efficiently identifying the data sets that are impacted by a policy constraint change. The system further allows identifying sets of instructions that need to be regenerated. As a result, the system improves the efficiency of implementing changes to policy constraints. Conventional techniques may require regeneration of more datasets than needed or regeneration of more execution plans than are impacted by the policy constraint change, thereby wasting computing and other resources.

ADDITIONAL CONSIDERATIONS

The foregoing description of the embodiments has been presented for the purpose of illustration; many modifications and variations are possible while remaining within the principles and teachings of the above description. The foregoing description of the embodiments has been presented for the purpose of illustration; many modifications and variations are possible while remaining within the principles and teachings of the above description. Embodiments comprise computer-implemented methods comprising steps of processes described herein. Embodiments comprise non-transitory computer readable storage medium storing instructions that when executed by one or more computer processors cause the one or more computer processors to perform steps of methods disclosed herein. Embodiments comprise computer system comprising one or more computer processors and a non-transitory computer readable storage medium storing instructions that when executed by one or more computer processors cause the one or more computer processors to perform steps of method disclosed herein.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The training process may include: applying the machine learning model to a training example, comparing an output of the machine learning model to the label associated with the training example, and updating weights associated for the machine learning model through a back-propagation process. The weights may be stored on one or more computer-readable media, and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A computer-implemented method comprising:

generating a plurality of execution plans, comprising, for each of a plurality of natural language data analytics requests:

receiving the natural language data analytics request, generating an execution plan for processing the natural language data analytics request using a machine learning based language model, and storing the execution plan in association with the natural language data analytics request;

receiving a new natural language data analytics request;

matching the new natural language data analytics request against each of the plurality of natural language data analytics requests to identify a matching natural language data analytics request, comprising determining whether a vector distance between a vector embedding representing the new natural language data analytics request and a vector embedding representing the natural language data analytics request is below a threshold value;

generating an execution plan for processing the new natural language data analytics request, using a prompt requesting the machine learning based language model to generate an execution plan for the new natural language data analytics request, the prompt specifying the execution plan of the matching natural language data analytics request;

comparing the execution plan of the new natural language data analytics request with the execution plan of the matching natural language data analytics request based on feedback received for each execution plan; and determining based on the feedback, whether to replace the execution plan of the matching natural language data analytics request based on the execution plan of the new natural language data analytics request.

2. The computer-implemented method of claim 1, wherein the execution plan comprising a set of steps, each step comprising a set of instructions, and wherein the prompt further specifies sets of instructions corresponding to steps of the execution plan of the matching natural language data analytics request.

3. The computer-implemented method of claim 1, wherein a step performs one or more of:

accessing data stored in a data store;

cleansing data accessed from a data store;

analyzing data obtained from a data store to compute one or more metrics;

generate a report; or configure visualization of a report.

4. The computer-implemented method of claim 1, further comprising:

executing the execution plan of the new natural language data analytics request to generate a report, and sending the report for displaying via a user interface.

5. The computer-implemented method of claim 4, wherein the user interface for displaying the report is a dashboard, wherein executing the execution plan of the new natural language data analytics request to generate a report and sending the report for displaying via a user interface are performed based on a predetermined schedule for displaying the report on the dashboard.

6. The computer-implemented method of claim 1, wherein the execution plan of the new natural language data analytics request incorporates one or more sets of instructions from the execution plan of the matching natural language data analytics request, wherein each of the one or more sets of instructions is marked as materialized.

7. A non-transitory computer readable storage medium storing instructions that when executed by one or more computer processors cause the one or more computer processors to perform steps comprising:

generating a plurality of execution plans, comprising, for each of a plurality of natural language data analytics requests:

receiving the natural language data analytics request, generating an execution plan for processing the natural language data analytics request using a machine learning based language model, and storing the execution plan in association with the natural language data analytics request;

receiving a new natural language data analytics request;

matching the new natural language data analytics request against each of the plurality of natural language data analytics requests to identify a matching natural language data analytics request, comprising determining whether a vector distance between a vector embedding representing the new natural language data analytics request and a vector embedding representing the natural language data analytics request is below a threshold value;

generating an execution plan for processing the new natural language data analytics request, using a prompt requesting the machine learning based language model to generate an execution plan for the new natural language data analytics request, the prompt specifying the execution plan of the matching natural language data analytics request;

comparing the execution plan of the new natural language data analytics request with the execution plan of the matching natural language data analytics request based on feedback received for each execution plan; and determining based on the feedback, whether to replace the execution plan of the matching natural language data analytics request based on the execution plan of the new natural language data analytics request.

8. The non-transitory computer readable storage medium of claim 7, wherein the execution plan comprising a set of steps, each step comprising a set of instructions, and wherein the prompt further specifies sets of instructions corresponding to steps of the execution plan of the matching natural language data analytics request.

9. The non-transitory computer readable storage medium of claim 7, wherein a step performs one or more of:

accessing data stored in a data store;

cleansing data accessed from a data store;

analyzing data obtained from a data store to compute one or more metrics;

generate a report; or configure visualization of a report.

10. The non-transitory computer readable storage medium of claim 7, the instructions causing the one or more computer processors to further perform steps comprising:

executing the execution plan of the new natural language data analytics request to generate a report, and sending the report for displaying via a user interface.

11. The non-transitory computer readable storage medium of claim 10, wherein the user interface for displaying the report is a dashboard, wherein executing the execution plan of the new natural language data analytics request to generate a report and sending the report for displaying via a user interface are performed based on a predetermined schedule for displaying the report on the dashboard.

12. The non-transitory computer readable storage medium of claim 7, wherein the execution plan of the new natural language data analytics request incorporates one or more sets of instructions from the execution plan of the matching natural language data analytics request, wherein each of the one or more sets of instructions is marked as materialized.

13. A computer system comprising:

one or more computer processors; and a non-transitory computer readable storage medium storing instructions that when executed by one or more computer processors cause the one or more computer processors to perform steps comprising:

generating a plurality of execution plans, comprising, for each of a plurality of natural language data analytics requests:

receiving the natural language data analytics request, generating an execution plan for processing the natural language data analytics request using a machine learning based language model, and storing the execution plan a in association with the natural language data analytics request;

receiving a new natural language data analytics request;

matching the new natural language data analytics request against each of the plurality of natural language data analytics requests to identify a matching natural language data analytics request, comprising determining whether a vector distance between a vector embedding representing the new natural language data analytics request and a vector embedding representing the natural language data analytics request is below a threshold value;

generating an execution plan for processing the new natural language data analytics request, using a prompt requesting the machine learning based language model to generate an execution plan for the new natural language data analytics request, the prompt specifying the execution plan of the matching natural language data analytics request;

comparing the execution plan of the new natural language data analytics request with the execution plan of the matching natural language data analytics request based on feedback received for each execution plan; and determining based on the feedback, whether to replace the execution plan of the matching natural language data analytics request based on the execution plan of the new natural language data analytics request.

14. The computer system of claim 13, wherein the execution plan comprising a set of steps, each step comprising a set of instructions, and wherein the prompt further specifies sets of instructions corresponding to steps of the execution plan of the matching natural language data analytics request.

15. The computer system of claim 13, wherein a step performs one or more of:

accessing data stored in a data store;

cleansing data accessed from a data store;

analyzing data obtained from a data store to compute one or more metrics;

generate a report; or configure visualization of a report.

16. The computer system of claim 13, the instructions causing the one or more computer processors to further perform steps comprising:

executing the execution plan of the new natural language data analytics request to generate a report, and sending the report for displaying via a user interface.

17. The computer system of claim 13, wherein the execution plan of the new natural language data analytics request incorporates one or more sets of instructions from the execution plan of the matching natural language data analytics request, wherein each of the one or more sets of instructions is marked as materialized.

18. The computer system of claim 16, wherein the user interface for displaying the report is a dashboard, wherein executing the execution plan of the new natural language data analytics request to generate a report and sending the report for displaying via a user interface are performed based on a predetermined schedule for displaying the report on the dashboard.

* * * * *